United States Patent
Czyryba et al.

(10) Patent No.: US 11,127,394 B2
(45) Date of Patent: Sep. 21, 2021

(54) METHOD AND SYSTEM OF HIGH ACCURACY KEYPHRASE DETECTION FOR LOW RESOURCE DEVICES

(71) Applicant: Intel Corporation, Santa Clara, CA (US)

(72) Inventors: Sebastian Czyryba, Mragowo (PL); Tobias Bocklet, Munich (DE); Kuba Lopatka, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 16/369,504

(22) Filed: Mar. 29, 2019

(65) Prior Publication Data

US 2019/0221205 A1 Jul. 18, 2019

(51) Int. Cl.
| | |
|---|---|
| *G10L 15/16* | (2006.01) |
| *G10L 15/02* | (2006.01) |
| *G06N 3/08* | (2006.01) |
| *G10L 15/06* | (2013.01) |
| *G10L 15/08* | (2006.01) |
| *G10L 15/22* | (2006.01) |
| *G10L 25/78* | (2013.01) |

(52) U.S. Cl.
CPC ............... *G10L 15/16* (2013.01); *G06N 3/08* (2013.01); *G10L 15/02* (2013.01); *G10L 15/063* (2013.01); *G10L 15/08* (2013.01); *G10L 15/22* (2013.01); *G10L 25/78* (2013.01); *G10L 2015/022* (2013.01); *G10L 2015/088* (2013.01); *G10L 2015/223* (2013.01)

(58) Field of Classification Search
CPC ....... G10L 15/16; G10L 15/02; G10L 15/063; G10L 15/08; G10L 15/22; G10L 25/78; G10L 2015/022; G10L 2015/088; G10L 2015/223; G06N 3/08
See application file for complete search history.

(56) References Cited

U.S. PATENT DOCUMENTS

| | | | |
|---|---|---|---|
| 5,384,893 A | 1/1995 | Hutchins | |
| 6,138,095 A | 10/2000 | Gupta et al. | |
| 6,205,424 B1 | 3/2001 | Goldenthal et al. | |
| 6,480,827 B1 | 11/2002 | McDonald | |

(Continued)

FOREIGN PATENT DOCUMENTS

| | | |
|---|---|---|
| KR | 100998230 B1 * | 12/2010 |
| WO | 2017091270 | 6/2017 |

OTHER PUBLICATIONS

Silingas et al., (2004). Specifics of Hidden Markov Model Modifications for Large Vocabulary Continuous Speech Recognition. Informatica, Lith. Acad. Sci.. 15. 93-110. 10.15388/Informatica. 2004.048. (Year: 2004).*

(Continued)

*Primary Examiner* — Michelle M Koeth
(74) *Attorney, Agent, or Firm* — Green, Howard & Mughal LLP.

(57) ABSTRACT

Techniques related to keyphrase detection for applications such as wake on voice are disclosed herein. Such techniques may have high accuracy by using scores of phone positions in triphones to select which triphones to use with a rejection model, using context-related phones for the rejection model, adding silence before keyphrase sounds for a keyphrase model, or any combination of these.

23 Claims, 15 Drawing Sheets

(56) References Cited

U.S. PATENT DOCUMENTS

| | | | |
|---|---|---|---|
| 6,594,630 B1* | 7/2003 | Zlokarnik | G10L 15/26 704/256.5 |
| 7,139,714 B2 | 11/2006 | Bennett et al. | |
| 7,457,748 B2 | 11/2008 | Nefti et al. | |
| 7,487,091 B2 | 2/2009 | Miyazaki | |
| 7,603,278 B2 | 10/2009 | Fukada et al. | |
| 7,720,683 B1 | 5/2010 | Vermeulen et al. | |
| 8,255,215 B2 | 8/2012 | Li et al. | |
| 8,527,271 B2 | 9/2013 | Wandinger et al. | |
| 8,818,802 B2 | 8/2014 | Fastow et al. | |
| 9,070,367 B1 | 6/2015 | Hoffmeister | |
| 9,299,338 B2 | 3/2016 | Kato | |
| 9,368,105 B1 | 6/2016 | Freed et al. | |
| 9,401,140 B1 | 7/2016 | Weber et al. | |
| 9,484,030 B1 | 11/2016 | Meaney | |
| 9,646,613 B2 | 5/2017 | Blouet | |
| 9,792,097 B2 | 10/2017 | Glendenning et al. | |
| 9,792,907 B2* | 10/2017 | Bocklet | G06F 40/284 |
| 10,157,610 B2* | 12/2018 | Tyagi | G10L 15/063 |
| 2002/0062212 A1 | 5/2002 | Nakatsuka | |
| 2002/0087314 A1 | 7/2002 | Fischer et al. | |
| 2007/0285505 A1 | 12/2007 | Korneliussen | |
| 2008/0281599 A1 | 11/2008 | Rocca | |
| 2010/0198598 A1 | 8/2010 | Herbig et al. | |
| 2010/0324900 A1 | 12/2010 | Faifkov et al. | |
| 2012/0166194 A1 | 6/2012 | Jung et al. | |
| 2012/0173234 A1 | 7/2012 | Fujimoto et al. | |
| 2012/0245934 A1 | 9/2012 | Talwar et al. | |
| 2013/0289994 A1 | 10/2013 | Newman et al. | |
| 2014/0025379 A1 | 1/2014 | Ganapathiraju et al. | |
| 2014/0058731 A1 | 2/2014 | Tyagi et al. | |
| 2014/0079297 A1 | 3/2014 | Tadayon | |
| 2014/0129224 A1 | 5/2014 | Chien | |
| 2014/0136200 A1 | 5/2014 | Winter et al. | |
| 2014/0172428 A1 | 6/2014 | Han | |
| 2014/0200890 A1 | 7/2014 | Kurniawati et al. | |
| 2014/0278435 A1 | 9/2014 | Ganong et al. | |
| 2014/0337030 A1 | 11/2014 | Lee et al. | |
| 2014/0337031 A1 | 11/2014 | Kim et al. | |
| 2014/0358539 A1 | 12/2014 | Rao et al. | |
| 2015/0025890 A1 | 1/2015 | Jagatheesan et al. | |
| 2015/0066495 A1 | 3/2015 | Zhang et al. | |
| 2015/0073795 A1 | 3/2015 | Tan | |
| 2015/0081296 A1 | 3/2015 | Lee et al. | |
| 2015/0095027 A1 | 4/2015 | Parada San Martin et al. | |
| 2015/0154953 A1 | 6/2015 | Bapat et al. | |
| 2015/0279358 A1 | 10/2015 | Kingsbury et al. | |
| 2015/0302847 A1 | 10/2015 | Yun et al. | |
| 2015/0340032 A1 | 11/2015 | Gruenstein | |
| 2015/0371631 A1 | 12/2015 | Weinstein et al. | |
| 2015/0371633 A1 | 12/2015 | Chelba | |
| 2016/0066113 A1 | 3/2016 | Elkhatib et al. | |
| 2016/0071516 A1 | 3/2016 | Lee et al. | |
| 2016/0092766 A1 | 3/2016 | Sainath et al. | |
| 2016/0098999 A1 | 4/2016 | Jacob et al. | |
| 2016/0111086 A1 | 4/2016 | Ziolko et al. | |
| 2016/0140956 A1 | 5/2016 | Yu et al. | |
| 2016/0180839 A1 | 6/2016 | Tomita | |
| 2016/0188573 A1 | 6/2016 | Tang | |
| 2016/0189706 A1 | 6/2016 | Zopf et al. | |
| 2016/0379632 A1 | 12/2016 | Hoffmeister et al. | |
| 2016/0379638 A1 | 12/2016 | Basye et al. | |
| 2017/0004824 A1 | 1/2017 | Yoo et al. | |
| 2017/0133038 A1 | 5/2017 | Jiang et al. | |
| 2017/0256255 A1* | 9/2017 | Bocklet | G06F 16/685 |
| 2017/0270919 A1 | 9/2017 | Parthasarathi | |
| 2017/0294188 A1 | 10/2017 | Hayakawa | |
| 2018/0005633 A1 | 1/2018 | Bocklet et al. | |
| 2018/0121796 A1 | 5/2018 | Deisher et al. | |
| 2018/0182388 A1 | 6/2018 | Bocklet et al. | |
| 2018/0261218 A1 | 9/2018 | Bocklet et al. | |
| 2018/0322876 A1 | 11/2018 | Bocklet et al. | |
| 2019/0043488 A1* | 2/2019 | Bocklet | G06N 7/005 |
| 2019/0043529 A1 | 2/2019 | Muchlinski et al. | |

OTHER PUBLICATIONS

Smidl et al., "Improving a Keyword Spotting System Using Phoneme Sequence Generated by a Filler Model," 2003, available at: https://www.researchgate.net/publication/267718572_Improving_a_Keyword_Spotting_System_Using_Phoneme_Sequence_Generated_by_a_Filler_Model, 5 pages. (Year: 2003).*

EPO English Machine Translation of KR 10-0998230B1, 2010. (Year: 2010).*

Chen, et al., "Small-Footprint Keyword Spotting Using Deep Neural Networks", 2014 IEEE International Conference on Acoustics, Speech and Signal Processing (ICASSP), May 4-9, 2014, 4087-4091.

Rose, et al., "A Hidden Markov Model Based Keyword Recognition System", 1990 ICASSP-90, vol. 1, 1990 International Conference on Acoustics, Speech, and Signal Processing, Apr. 3-6, 1990, 129-132.

Sackinger, et al., "Application of the ANNA Neural Network Chip to High-Speed Character Recognition", Mar. 18, 1991.

Zhang, et al., "Unsupervised Spoken Keyword Spotting via Segmental DTW on Gaussian Posteriorgrams", in Proceedings of Automatic Speech Recognition & Understanding Workshop (ASRU 2009), IEEE, 2009, Merano, Dec. 2009, 398-403.

Fujimoto, et al., "Frame-wise model re-estimation method based on Gaussian pruning with weight normalization for noise robust voice activity detection", Speech Communication, Elsevier Science Publishers, Amsterdam, NL, vol. 54, No. 2, Aug. 25, 2011, pp. 229-244.

Li, et al., "Robust Endpoint Detection and Energy Normalization for Real-Time Speech and Speaker Recognition", IEEE Transactions on Speech and Audio Processing, vol. 10, No. 3, Mar. 1, 2002.

* cited by examiner

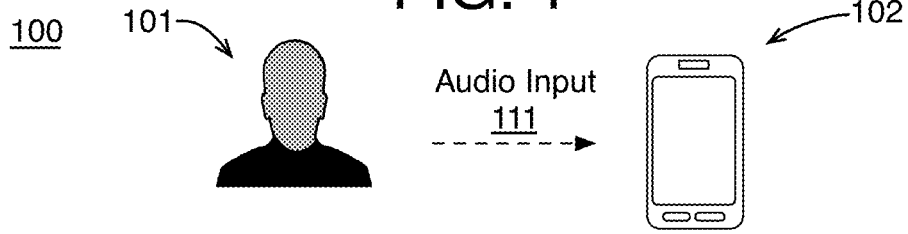
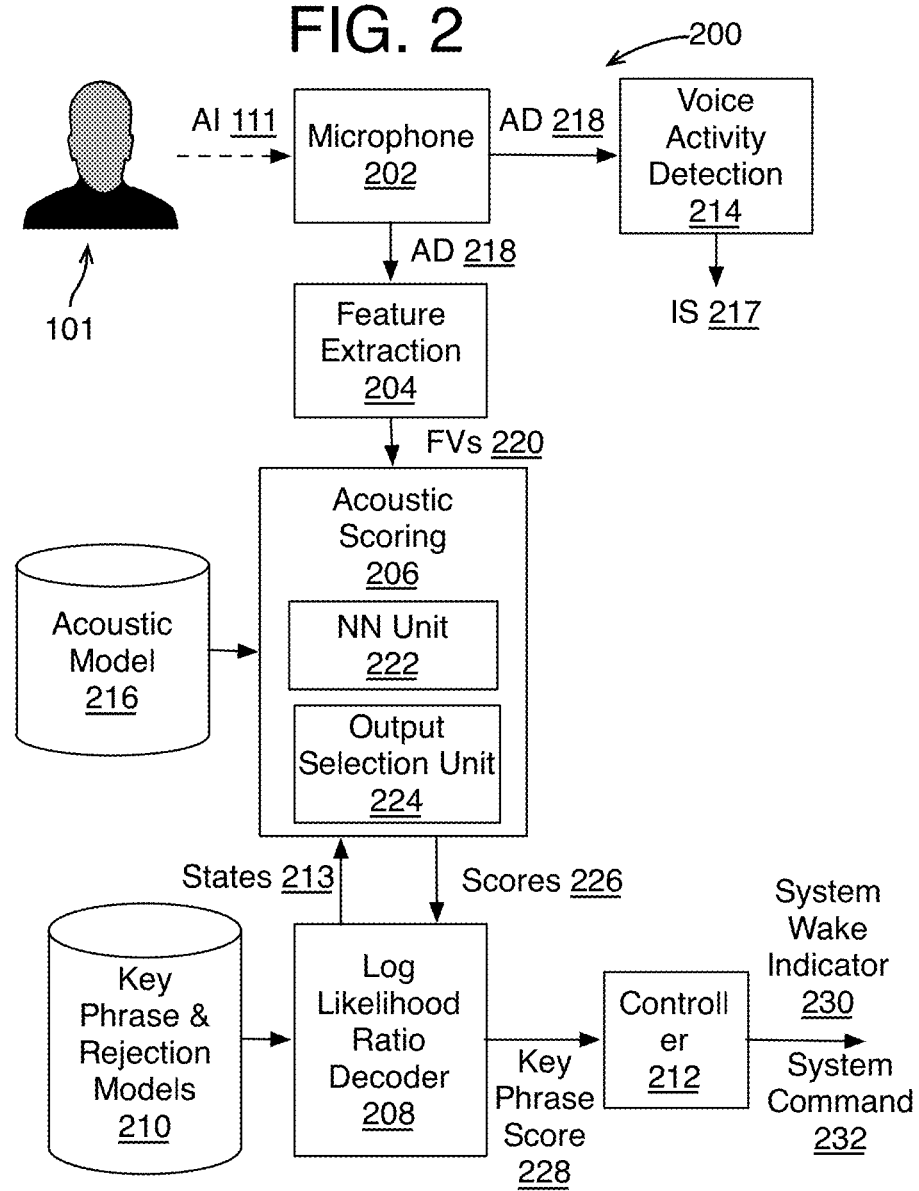

FIG. 8 CENTERPHONE REJECTION TABLE 1. 1800

|  | FRR[%] New rejection model | FRR[%] Old rejection model | reduction in % |
|---|---|---|---|
| Clean | 0.00 | 0.00 | 0.00 |
| cafe_etsi | 10.29 | 12.00 | -14.25 |
| cafeteria_15dB | 0.86 | 2.29 | -62.45 |
| cafeteria_9dB | 6.29 | 14.86 | -57.67 |
| side_music_15dB | 0.29 | 0.86 | -66.28 |
| side_music_9dB | 1.71 | 2.57 | -33.46 |
| pub_etsi | 6.29 | 7.71 | -18.42 |
| clean 50cm | 0.29 | 0.29 | 0.00 |
| LivingRoom 50cm | 0.29 | 0.86 | -66.28 |
| Pub 50cm | 0.29 | 1.43 | -79.72 |
| Work 50cm | 0.29 | 1.71 | -83.04 |
| SideSpeaker 50cm | 26.57 | 28.29 | -6.08 |
| Clean 400cm | 0.86 | 1.71 | -49.71 |
| LivingRoom 400cm | 6.00 | 7.71 | -22.18 |
| Pub 400cm | 16.57 | 19.14 | -13.43 |
| Work 400cm | 13.14 | 20.00 | -34.30 |
| SideSpeaker 400cm | 52.00 | 53.14 | -2.15 |
| Average | 8.35 | 10.27 | -35.85 |

TABLE 2. 1100

|  | Threshold | False Wakes on Podcasts [1/h] | FRR in clean [%] | similar phrases accepted [%] |
|---|---|---|---|---|
| Baseline Rejection | 3.887 | 0.1 | 2.64% | 24.70% |
| Contextphone Rejection | 2.597 | 0.1 | 1.32% | 9.30% |

FIG. 14

TABLE 3. 1400

| Spoken utterance | Score (model without silence) | Score (modeling silence – 250ms added to model) | Scores delta[%] |
|---|---|---|---|
| lab taxes | 4.0820 | 3.6602 | 10.33% |
| act three | 1.8008 | 1.1250 | 37.53% |
| collect | 3.1875 | 1.8672 | 41.42% |
| eighty five just is radical | 3.2891 | 2.3008 | 30.05% |
| would you a less go | 2.6484 | 1.4258 | 46.17% |
| 2010 lexus | 4.0664 | 3.9688 | 2.40% |
| melisa | 0.9336 | 0.4258 | 54.39% |
| flexible | 2.9219 | 2.1133 | 27.67% |
| unlike some people | 4.2578 | 3.2422 | 23.85% |
| garlic sauce | 3.3086 | 2.8516 | 13.81% |
| election | 2.9844 | 2.6836 | 10.08% |
| aa let say | 2.5742 | 2.3398 | 9.10% |
| ethics | 1.5547 | 0.5430 | 65.08% |
| told us bless it | 2.6289 | 1.8633 | 29.12% |
| a late scenery | 1.6641 | 0.9414 | 43.43% |
| will executed | 3.9766 | 3.0430 | 23.48% |
| Lexington | 3.7266 | 2.9180 | 21.70% |
| all except | 2.7422 | 1.8555 | 32.34% |
| that accept | 3.5586 | 2.6602 | 25.25% |
| aaa let say | 3.5859 | 1.8047 | 49.67% |
| if you elect me | 3.2578 | 3.0547 | 6.24% |
| electivility | 3.5625 | 3.1641 | 11.18% |
| we like to sound | 2.2031 | 1.7188 | 21.99% |

TABLE 4.

| Threshold | FalseWakes/85h: | | |
|---|---|---|---|
| | model - no silence | model - 500ms of silence | model - 750ms of silence |
| 2 | 419 | 43 | 22 |
| 2.1 | 324 | 39 | 20 |
| 2.2 | 283 | 36 | 17 |
| 2.3 | 232 | 31 | 14 |
| 2.4 | 177 | 29 | 10 |
| 2.5 | 146 | 26 | 9 |
| 2.6 | 119 | 20 | 7 |
| 2.7 | 91 | 16 | 7 |
| 2.8 | 68 | 12 | 7 |
| 2.9 | 56 | 9 | 7 |
| 3 | 47 | 8 | 6 |
| 3.1 | 44 | 6 | 5 |
| 3.2 | 36 | 5 | 5 |
| 3.3 | 29 | 5 | 3 |
| 3.4 | 24 | 4 | 3 |
| 3.5 | 21 | 4 | 3 |
| 3.6 | 17 | 3 | 3 |
| 3.7 | 12 | 3 | 3 |
| 3.8 | 9 | 3 | 3 |
| 3.9 | 6 | 3 | 2 |
| 4 | 5 | 3 | 0 |

TABLE 5. 1700

|  | BestPhone FRR[%] | CenterPhone FRR[%] | CenterPhone + additional silence FRR[%] |
|---|---|---|---|
| Alexa_SP4_amazon_spec_220_clean_3ft | 9.09 | 3.64 | 2.73 |
| Alexa_SP4_amazon_spec_220_clean_9ft | 46.61 | 28.51 | 20.36 |

FIG. 19
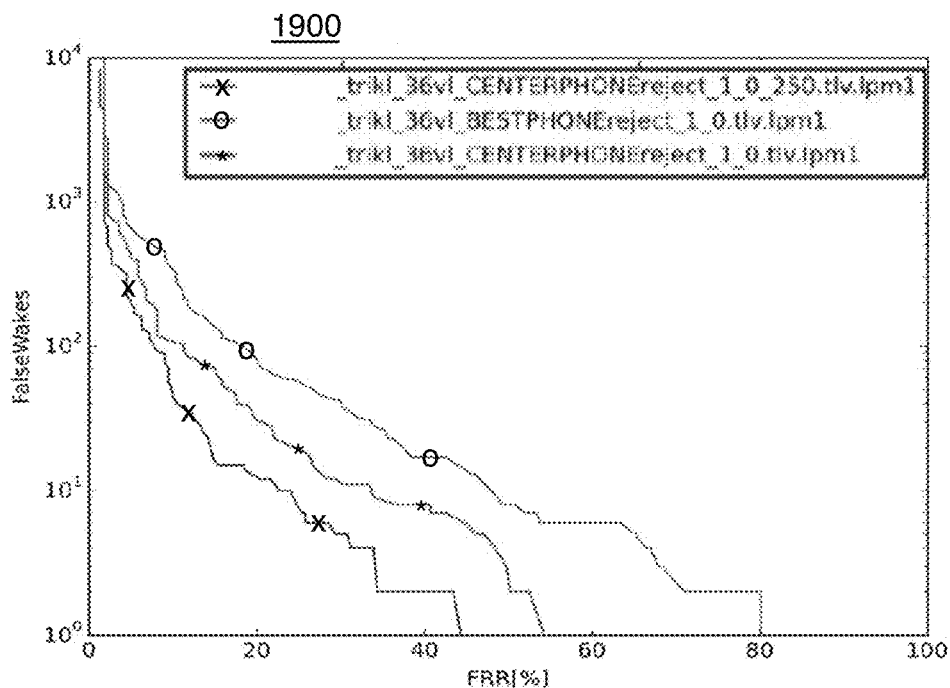
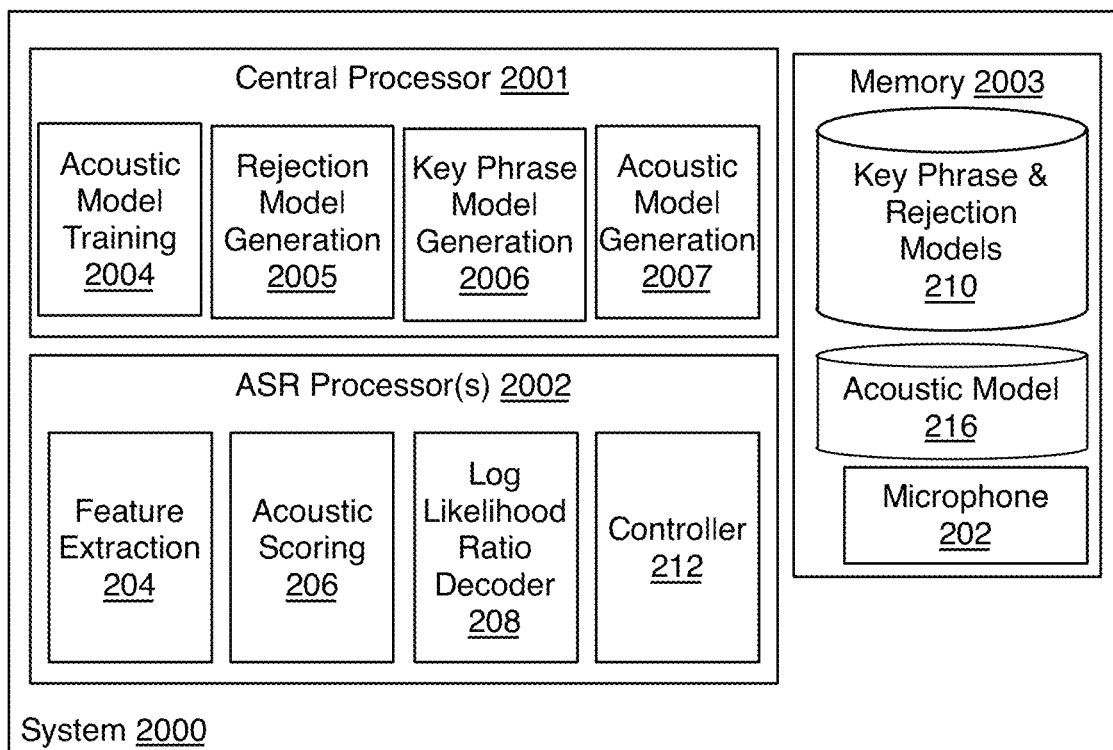
FIG. 20

METHOD AND SYSTEM OF HIGH ACCURACY KEYPHRASE DETECTION FOR LOW RESOURCE DEVICES

BACKGROUND

Keyphrase detection (such as Wake-on-Voice or WoV), or hot word detection systems may be used to detect a word or phrase, or the like referred to as a waking phrase. The detection of such a waking phrase may initiate an activity by a device. For example, the device may wake by transitioning from a low power listening state or sleep mode to an active mode, and in many cases, activates a particular computer program such as a personal assistant (PA) application.

Such systems are often placed on multi-purpose devices such as smart phones where the consumers increasingly demand energy savings to increase power life of the device while also demanding the highest possible quality. While some low resource WoV systems already exist, these systems still consume too much power due to inefficient memory usage and heavy computational loads while these systems still can be noticeably inaccurate by waking to spoken words that are close to, but not the same as, the actual keyphrase, often resulting in an annoying and time-wasting experience for the user.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is an illustrative diagram of an example setting for providing keyphrase detection;

FIG. 2 is an illustrative diagram of an example system for providing keyphrase detection according to at least one of the implementations herein;

FIG. 8 is a Centerphone Rejection Table 1 showing test results of the process of FIG. 6;

FIG. 14 is a Table 3 of results by using the silence states according to at least one of the implementations herein;

FIG. 15 is a Table 4 of further results by using the silence states according to at least one of the implementations herein;

FIG. 19 is a graph comparing the results of more combinations of the keyphrase detection methods disclosed herein;

FIG. 20 is an illustrative diagram of an example system for performing wake-on-voice decoder modeling according to at least one of the implementations herein;

DETAILED DESCRIPTION

Figure 3:
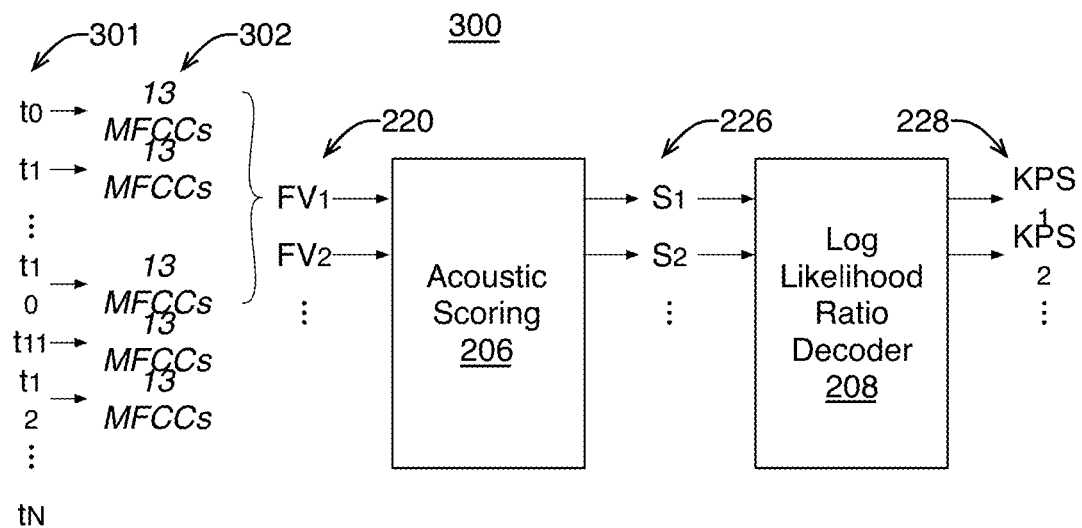
FIG. 3 illustrates example data structures associated with keyphrase detection.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples herein except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, computing platforms, and articles are described herein related to high accuracy keyphrase detection for low resource devices.

As described above, keyphrase or hot word detection systems may be used to detect a word or phrase or the like, which may initiate an activity by a device such as waking the device from a low power or sleep mode to an active mode based on detection of the keyphrase. As used herein, the term keyphrase may indicate any audio indicator or acoustic event to be detected such as a phrase, a word, or a group of phones, or an audio or acoustic event such as a baby's cry, a scream, or the like. Furthermore, the keyphrase may be predetermined for use by the system such that detection of a predetermined keyphrase may be provided. In an implementation, an energy based voice activation detection may detect speech, or some form of audio input, and keyphrase detection as discussed herein may be initiated based on the voice activation detection.

In some implementations, a time series of scores of sub-phonetic units may be generated based on a time series of feature vectors representative of received audio input that may include input speech. For example, audio input that may include an input speech stream may be received via a microphone, and the resultant audio data may be sampled over time to generate extracted coefficients such as Mel frequency cepstrum coefficients (MFCCs) or the like. Multiple sets of MFCCs (for example, attained over time) may be stacked to form a feature vector such as a multi-dimensional feature vector. Furthermore, such feature vectors may be generated over time to provide a time series of feature vectors representative of the received audio that may include speech. Such feature vectors may be scored based on an acoustic model such as a deep neural network (DNN) or the like to provide the scores of the sub-phonetic units. For example, at least some of the sub-phonetic scores may be associated with a likelihood a particular triphone has been spoken, but can also score sub-phonetic units that are single phoneme (or single phones or monophones), sub-phones, or even provide a single output score for multiple tri-phones.

Based on the scores of sub-phonetic units (e.g., the outputs of the acoustic model), a start state based rejection model (or just rejection model) and a keyphrase model associated with a predetermined keyphrase may be updated. For example, the start state based rejection model and the keyphrase model may be updated at each time instance of an output from the acoustic model. The start state based rejection model may include, for example, a single state having self loops associated with some of the scores of sub-phonetic units of the acoustic model. Such self loops may include updates to the single rejection state based on outputs from the acoustic model without any transitions from other states of the model. Furthermore, the keyphrase model may include a multi-state lexicon look up keyphrase model having transitions between the states that are associated with the lexicon look up for the predetermined keyphrase.

Based on the updates to the start state based rejection model and the keyphrase model, a determination may be made as to whether the received input speech is associated with the predetermined keyphrase. For example, the single state of the start state based rejection model may provide a rejection likelihood score (e.g., a likelihood the received speech is not the keyphrase), and the final state of the keyphrase model provide a keyphrase likelihood score (e.g., a likelihood the received speech is the keyphrase) for the received audio input. The determination as to whether the received audio input is associated with the predetermined keyphrase may be determined based on the rejection likelihood score and the keyphrase likelihood score. For example, a likelihood score (e.g., a log likelihood ratio) based on the rejection likelihood score and the keyphrase likelihood score may be determined and compared to a predetermined threshold. For example, if the log likelihood score is greater than the threshold, the device may be activated or woken from a sleep mode or the like. By one approach, the likelihood score is a difference between the likelihood scores of the key phrase model and the rejection model. Such a keyphrase detection system is disclosed by U.S. Pat. No. 9,792,097, filed Nov. 24, 2015, and issued Oct. 17, 2017.

Difficulties arise with the known keyphrase detection models because there is still a relatively large number of non-keyphrase or rejection sub-phonetic units or scores that are received, and in turn provided, by the rejection model. By one form, the rejection model provides up to 100 rejection outputs using an n-best selected score analysis, and where each output score has different sub-phonetic units each from an output of the acoustic model which may have about 4000 outputs. This causes a very heavy computational load consuming processor time with large memory capacity requirements, and in turn, consuming too much power on low resource devices. The conventional acoustic model can be formed in different sizes, but smaller models have poor quality.

In one known attempt to reduce the computational load and memory capacity requirements, the acoustic model, the start state based rejection model, and the keyphrase model may be generated by training an acoustic model using a training set of audio such that the acoustic model has multiple outputs including tied triphone (e.g., HMM-) states. For example, each of the tied triphone states may be associated with one of multiple monophones (or phonemes) in a lexicon representing the language being used. Furthermore, the acoustic model may include outputs representative of non-speech such as silence or background noise. In an implementation, an acoustic model (e.g., a DNN) may be trained by inputting audio data. Based on the acoustic model outputs (e.g., DNN-outputs), the triphones where each possible phoneme is a centerphone may be selected to remain as an output of the acoustic model. The acoustic model outputs corresponding to the centerphone that has been observed the most often during training may be selected, or in other words, the output scores of the triphones are selected, and such selected acoustic model outputs may be used as or in the rejection model. For example, one or the N most important center-phone acoustic model outputs for each monophone may be selected for the rejection model. This still required a relatively large number of rejection scores to be handled by the rejection model such as the 100 outputs mentioned above that were also added to the rejection model. These conventional acoustic models could provide even less outputs such as 50 but the quality (or accuracy) of the speech recognition would then decline even more significantly.

By another method, a separate data structure was used to select which rejection outputs should be kept on the acoustic model. The data structure used all monophones (or phonemes) that were considered to represent a desired lexicon in a desired language, and a classification operation counted the number of observations of output triphones based on forced alignment during model-training. The importance of the output triphones was determined according to that occurrence. Forced alignment refers to a modeling system by mapping the lexicon monophones to a sequence of phones so that an input of acoustic observations can be used to score states on a linear model of phonemes. The forced alignment specifically refers to forcing the phones into a word or phrase order. The result was a tied HMM-state triphone (also referred to as senones herein) with the most occurrences associated with an individual monophone, regardless of which phones formed the triphone. The triphones with the most occurrences were maintained as an output of the acoustic model and input to the rejection model. This technique was able to reduce the number of rejection sub-phonetic units of the acoustic model outputs to about 100 sub-phonetic scores arranged to be received by the rejection model. Such a technique was still considered to have too much computational load and memory capacity requirements, while the error rate of these systems was still considered too high.

Another difficulty with automatic speech recognition (ASR) systems and models generally is that false accept error rates still are often too high. Such systems frequently wake upon hearing a word or phrase close to the keyphrase, such as Yellow for the keyphrase "Hello" or the name Sari for the keyphrase "Siri". Some errors occur when the keyphrase can be heard in the middle of a sentence, for example "garlic sauce"/ gaːlik sɔːs/ without the first phone /g/ and then last phone /s/ sounds very similar to "Alexa"/ aːlik sɔ/. Frequent errors such as these result in a bad experience for the user.

To resolve these issues, a number of techniques disclosed herein can be used either alone or together to reduce computational loads, memory capacity requirements, power consumption, and error rates. A centerphone selection technique disclosed herein uses a classification data structure where a phoneme inventory, or lexicon of monophones that represent a language, are iterated through, and the output triphones where each phoneme appears as center-phone (a center HMM-state) are selected. The selected center-phone triphones are sorted according to the number of occurrences, and the triphone with the most occurrences, or N most occurrences, for each phoneme at the centerphone of triphone, are selected to be rejection output from the acoustic model, input to the rejection model, and for that specific phoneme. This process is performed for each phoneme so that the final rejection model may have as many rejections as there are phonemes in the inventory, by one example. When the acoustic model is pruned so only these outputs are provided on the acoustic model for rejected speech, this may substantially reduce the number of speech rejection outputs to the number of monophones, thereby significantly reducing the computational load, memory requirements, and power consumption. Additionally, this technique has found to provide a substantial increase in accuracy by reducing the error rate by 36% especially in noisy and reverberant conditions over conventional ASR systems that do not reduce the number of acoustic model outputs in this way. This appears to be due to the data-driven nature of the approach such that the center-phone tracked triphone has a relatively high probability of rejection with regard to a single monophone or phoneme, and therefore having a surprisingly very good representation over a wide range of input audio data such as different triphones with the same centerphone. This permits a reduction of speech (or non-keyphrase) rejection outputs to have only one neural network output per monophone while still providing excellent coverage with a competitive false rejection rate. Also in the disclosed method, since one rejection output may be selected for each phonetic unit/phoneme based on the center-triphone selection method, the most important output can be selected from the center-triphone statistics, which significantly increases the accuracy as well.

Another technique is referred to herein as the context-phone technique and includes training the rejection model to receive scores of non-keyphrase (or speech rejection) triphone acoustic model outputs that have one or two monophones (or phonemes) changed from a keyphrase triphone obtained from triphone sequences that form a target keyphrase to be detected. Adding the keyword triphones with one or two phones changed enables reducing the wakes (or false accepts) on similar words from 25% to less than 10%.

It also will be appreciated that both of these lexicon tuning solutions are universal in that they work independently relative to the wording in the phrases (it is not limited to certain wording in the keyphrases).

By yet another solution, a silence modeling technique may be used. It has been found that many false wakes occur due to noisy scenarios when speech or music exists in the background and when keyphrases have been accepted when in the middle of sentences or words, such as the garlic sauce example mentioned above. In order to reduce the number of false wakes, and thereby increase the accuracy of the speech recognition, silence may be added before or after a keyphrase. Additional silent states lower a final score versus the scores of audio without added silence in an incoming noisy signal. When the score is lower, then a better possibility exists to determine a lower threshold to accept more real phrases and still avoid false wakes. Specifically, adding silence lengthens the keyphrase model, and the longer the keyphrase, the lower the number of false wakes. The silence also reduces the chances for the ASR system to misclassify the input audio, such as when the words sound alike such as with the garlic sauce example, or when the exact keyphrase is within a larger word, such as with Alexa in Alexander. By placing silence at the end of the keyphrase Alexa, the system should not be triggered when someone says Alexander instead.

Thus, these false wakes can be reduced when silence is modeled in front of, or at the end of, the keyphrase, resulting in lower false accepts. This silence modeling helps to ignore unwanted detections or false wakes, especially when the keyphrase can be a "sub-phrase" of other words or can be very similar to other words. This approach involves adding a number of silence states before or after the keyphrase states on the keyphrase model, and adding a number of silence states depending on the desired duration of the silence as explained below. On average, this approach reduces the score of unwanted wakes by about 28% compared to conventional ASR techniques without such silence modeling. Finally, the three methods disclosed herein (centerphone contextphone, and added silence) can work separately or together in any combination.

Referring now to FIG. 1, an example setting 100 provides keyphrase detection, arranged in accordance with at least some implementations of the present disclosure. As shown in FIG. 1, setting 100 may include a user 101 providing audio input 111 to a device 102. For example, device 102 may be in a deep sleep or power saving mode or the like and user 101 may be attempting to wake device 102 via keyphrase detection. If user 101 provides audio input 111 that is identified as the keyphrase of device 102, device 102 may wake from a sleep or power saving mode or the like. For example, device 102 may provide an automatic wake on voice capability for user 101. As shown, in some examples, an automatic wake on voice system may be implemented via device 102 such that device 102 may be a smartphone. However, device 102 may be any suitable device such as a computer, a laptop, an ultrabook, a smartphone, a tablet, a phablet, a smart speaker, a smart microphone, a wearable device such as a smart watch, smart headphones, or smart eye glasses, or the like. In any case, device 102 may be described as a computing device as used herein.

As shown, in some examples, user 101 may provide audio input 111 in an attempt to wake device 102 or the like. As will be appreciated, device 102 also may receive as audio input background noise, silence, background speech, speech not intended to attain access to device 102, and the like. For example, device 102 may need to differentiate or classify audio (e.g., audio input 111 or other audio) that does not match a predetermined keyphrase (e.g., as provided by a rejection model as discussed herein) from audio that matches the predetermined keyphrase (e.g., as provided by a keyphrase model as discussed herein).

Referring to FIG. 2, an example system 200 for providing keyphrase detection is arranged in accordance with at least some implementations of the present disclosure. As shown in FIG. 2, system 200 may include a microphone 202, a feature extraction module 204, an acoustic scoring module 206, a log likelihood ratio decoder 208, keyphrase and rejection models 210, a controller 212, a voice activity detection module 214, and an acoustic model 216. For example, as shown in FIG. 2, log likelihood ratio decoder 208 may provide a keyphrase score 228 to controller 212. Based on keyphrase score 228 (e.g., if keyphrase score 228 is greater than a threshold or the like), controller 212 may provide a system wake indicator 230 (e.g., if keyphrase score 228 indicates a predetermined keyphrase has been matched) or controller 212 may not provide such an indicator, and system 200 may continue evaluating input speech for a match. As shown, in some examples, controller 212 may also provide a system command 232 associated with the keyphrase to request system 200 or another system to perform an operation such as starting an application, generating or retrieving data, or the like. As is discussed further herein, in some implementations, feature extraction module 204, acoustic scoring module 206, log likelihood ratio decoder 208, controller 212, and voice activity detection module 214 may be implemented via a shared or specific function digital signal processor (DSP), fixed function hardware, and/or other processors.

As discussed, in some implementations, system 200 may implement a single keyphrase such that, upon detection of the keyphrase, system wake indicator 230 and/or system command 232 may be provided. In other implementations, system 200 may implement multiple keyphrases (based on implementing multiple keyphrase models as discussed herein). In such implementations, if any of the keyphrases are detected, system wake indicator 230 and/or system command 232 may be provided. Furthermore, system command 232 may be associated with a particular keyphrase of the keyphrases. For example, a first wake up command (e.g., keyphrase) such as "Computer, Play Music" may wake the device (e.g., via system wake indicator 230) and play music (e.g., via a music play command implemented by system command 232) and a second wake up command (e.g., keyphrase) such as "Computer, Do I Have Mail? may wake the device (e.g., via system wake indicator 230) and determine whether mail has been received (e.g., via a get mail command implemented by system command 232). Other wake indicators and commands may wake a personal assistant (PA) such as for example, Siri, Alexa, Cortana, or Google to name a few popular PAs, to then perform a command, such as a search for information.

As shown, microphone 202 may receive audio input (AI) 111 from user 101 (or multiple users or an environment or the like). In some examples, audio input 111 is issued by user 101 to wake system 200 and/or to have system 200 perform an operation. As discussed, microphone 202 may receive audio input that is not intended to wake system 200 or other background noise or even silence. For example, audio input 111 may include any speech issued by user 101 and any other background noise or silence or the like in the environment of microphone 202. Audio input 111 may be characterized as audio, input audio, an input speech stream, or the like. Microphone 202 may receive audio input 111 and/or other audio (e.g., as sound waves in the air) and convert audio input 111 and/or such other audio to an electrical signal such as a digital signal to generate audio data (AD) 218. For example, audio data 218 may be stored in memory (not shown in FIG. 2), transferred for continued processing, or the like, and may be referred to as an audio signal.

As shown, voice activity detection module 214 may receive audio data 218. For example, voice activity detection module 214 may operate (e.g., via a DSP or other processor) even in a deep sleep mode of system 200 to continuously monitor audio data 218. Upon detection of a voice or other sound that requires further evaluation by system 200, voice activity detection module 214 may provide initiation signal (IS) 217, which may activate the other modules of system 200 to provide keyphrase detection. For example, voice activity detection module 214 may provide initiation signal 217 to feature extraction module 204 to activate feature extraction module 204 and other components of system 200. In an implementation, a portion of audio data 211 (e.g., 360 ms of audio data or the like) may be buffered by a ring-buffer or the like. When a voice or other sound that requires further evaluation is detected by voice activity detection module 214, feature extraction module 204 may receive the data from the buffer and further incoming audio via audio data 218.

If a predetermined keyphrase is detected, as discussed herein, system 200 may enter a higher level mode of operation for user 101. Furthermore, voice activity detection module 214 may operate during keyphrase detection (e.g., while a keyphrase is not detected or not yet detected) to determine whether system 200 may be put back into a deep sleep mode or the like. For example, voice activity detection module 214 may provide a low power always listening capability for system 200. For example, upon activation by initiation signal 217, audio data 218 may be continuously monitored for keyphrase detection until controller 212 determines a keyphrase has been detected and system wake indicator 230 is provided or until a determination is made by voice activity detection module 214 to reenter a sleep mode or low power state or the like.

As discussed, feature extraction module 204 may receive audio data 218. For example, feature extraction module 204 may receive audio data 218 from microphone 202, from the discussed buffer, from other memory of system 200, or the like and feature extraction module 204 may generate feature vectors 220 associated with audio input 111. Feature vectors 220 may be any suitable features or feature vectors or the like representing audio input 111. For example, feature vectors 220 may be a time series of feature vectors (e.g., feature vectors each generated for an instance of time) such that each of feature vectors 220 includes a stack of features or feature vectors each from an instance of time such as a sampling time or the like.

Referring to FIG. 3, example data structures 300 are associated with keyphrase detection, and are arranged in accordance with at least some implementations of the present disclosure. As shown in FIG. 3, at each of multiple sampling times 301 (e.g., represented as sampling times $t_0$, $t_1, \ldots, t_x$), sampling coefficients 302 such as Mel frequency cepstrum coefficients (MFCCs) or the like may be generated. Sampling times 301 may be at any suitable interval such as every 10 ms or the like and the sampling performed at each sampling time of sampling times 301 may sample any duration of input speech or audio such as 25 ms of audio or the like. Sampling coefficients 302 may include any number of sampling coefficients such as 13 coefficients as in the illustrated example. Furthermore, sampling coefficients 302 may each be referred to as features, a feature vector, a sampling, or the like. For example, sampling coefficients 302 may be coefficients representing a power spectrum of the received audio. As discussed, in an implementation, sampling coefficients 302 are Mel frequency cepstrum coefficients representing a power spectrum of the received audio. For example, with reference to FIG. 2, Mel frequency cepstrum coefficients may be determined based on audio input 111 (e.g., via audio data 218) by either taking a Fourier transform, or by using delta modulation and specialized FIR filtering that avoids Fourier transform, of audio input 111 and/or audio received via microphone 202, mapping to the Mel scale, determining logs of the powers at each Mel frequency, and determining the Mel frequency cepstrum coefficients based on a discrete cosine transform (DCT) of the logs of the powers.

With continued reference to FIG. 3, sampling coefficients 302 may be stacked or concatenated or combined or the like to generate feature vectors 220. As shown, in an implementation, 11 instances of sampling coefficients 302 may be combined to generate each feature vector of feature vectors 220. Furthermore, prior to stacking, sampling coefficients 302 may be normalized or the like. For example, Mel frequency cepstrum coefficients may be processed by cepstral mean normalization or the like to generate sampling coefficients 302. As shown, in an implementation, 11 instances of sampling coefficients 302 may be combined to generate each feature vector such that each feature vector is a 143 (e.g., 11×13) dimensional vector. However, any number of instances of sampling coefficients 302 may be combined or stacked to generate feature vectors 220. As shown, feature vector $FV_1$ may include sampling coefficients associated with times $t_0$-$t_{10}$. Furthermore, feature vector $FV_2$ may include sampling coefficients associated with times $t_1$-$t_{11}$, feature vector $FV_3$ may include sampling coefficients associated with times $t_2$-$t_{12}$, and so on such that adjacent feature vectors have overlap with respect to sampling coefficients 302 that are included therein.

As shown in FIGS. 2 and 3, feature vectors 220 may be provided to acoustic scoring module 206. Acoustic scoring module 206 may score feature vectors 220 based on acoustic model 216 as received via memory and provide any number of output scores 226 based on feature vectors 220. Output scores 226 may be characterized as scores, probabilities, probability density functions (PDFs), PDF scores, scores of sub-phonetic units, or the like. For example, acoustic scoring module 206 may generate such output scores or states for each of feature vectors 220 to generate a time series of scores 226 (e.g., represented as scores $S_1, S_2, \ldots$ in FIG. 3). For example, scores 226 may be a time series of scores of sub-phonetic units. In an implementation, acoustic scoring module 206 receives and implements acoustic model 216 as discussed herein. In an implementation, acoustic model 216 may be a deep neural network (DNN) pretrained based on a training set of audio and data may be propagated through the neural network by a neural network (NN) unit 222. In an implementation, acoustic model 208 may be a deep neural network having any number of outputs such as 4000 initial outputs or the like including rejection, silence, and keyphrase outputs. An output selection unit 224 may provide scores of certain outputs of the acoustic model to certain input nodes, states, or self-loops of a rejection model and a keyphrase model forming the keyphrase detection model 210 used by the decoder 208 as described below.

In another implementation, acoustic model 206 is a pruned deep neural network having the number of outputs reduced or pruned such that only a subset of available outputs (e.g., as determined during set-up and/or training as described below) are provided or activated. Such pruning may provide a smaller memory footprint and/or lower computational requirements during implementation. Such required outputs may be provided by states signal 213 or such required outputs may be preset or pretrained prior to implementation.

For example, the outputs of acoustic scoring module 206 (e.g., scores 226) may represent sub-phonetic units such as sub-phones, monophones, but also tied context-dependent triphone states, or in other words, where a single acoustic model output, or output node, is a triphone of three phonemes or phones. Such tied context-dependent triphone states may represent monophones tied to monophones on either side (e.g., left and right) to generate tied context-dependent triphones. A language, for example, may have a number of monophones (e.g., 30-50 monophones) and sub-phonetic units such as exemplary tied context-dependent triphone states may include each of such monophones in a variety of contexts such that various other monophones are before and after such monophones to generate many combinations (e.g., the sub-phonetic units). Acoustic scoring module 206 may, based on feature vectors 220, provide probabilities or scores or the like associated with such sub-phonetic units (e.g., probabilities or scores as to which unit or phone has been spoken) as well as outputs for probabilities or scores associated with rejection such as non-speech (non-spoken) outputs including silence and/or background sounds including non-speech noise or speech-related noise. As shown in FIG. 3 and as discussed further herein, for each or some of scores 226, the log likelihood ratio decoder 208 may generate a corresponding keyphrase score 228 (e.g., represented as keyphrase scores $KPS_1$, $KPS_2$, . . . ). In the example of FIG. 3, a keyphrase score 228 is generated at each time instance as associated with scores 226. In other examples, a keyphrase score 228 may be generated at less frequent time intervals.

Furthermore, as discussed, in some implementations, a single keyphrase may be detected and a system may be woken (e.g., via system wake indicator 230) and an optional command may be issued (e.g., via system command 232) based on the detected keyphrase. In other implementations, a second or additional keyphrases may be implemented and associated keyphrase models may be evaluated by log likelihood ratio decoder 208. For example, such keyphrase models may be evaluated and associated keyphrase scores may be evaluated to determine whether a particular keyphrase of multiple keyphrases has been detected. For example, as discussed further with respect to FIG. 5, multiple keyphrase models may be provided. In the context of FIG. 3, log likelihood ratio decoder 208 may generate a keyphrase score or scores for each of such keyphrase models (and at multiple time instances) for evaluation by controller 212.

Figure 4:
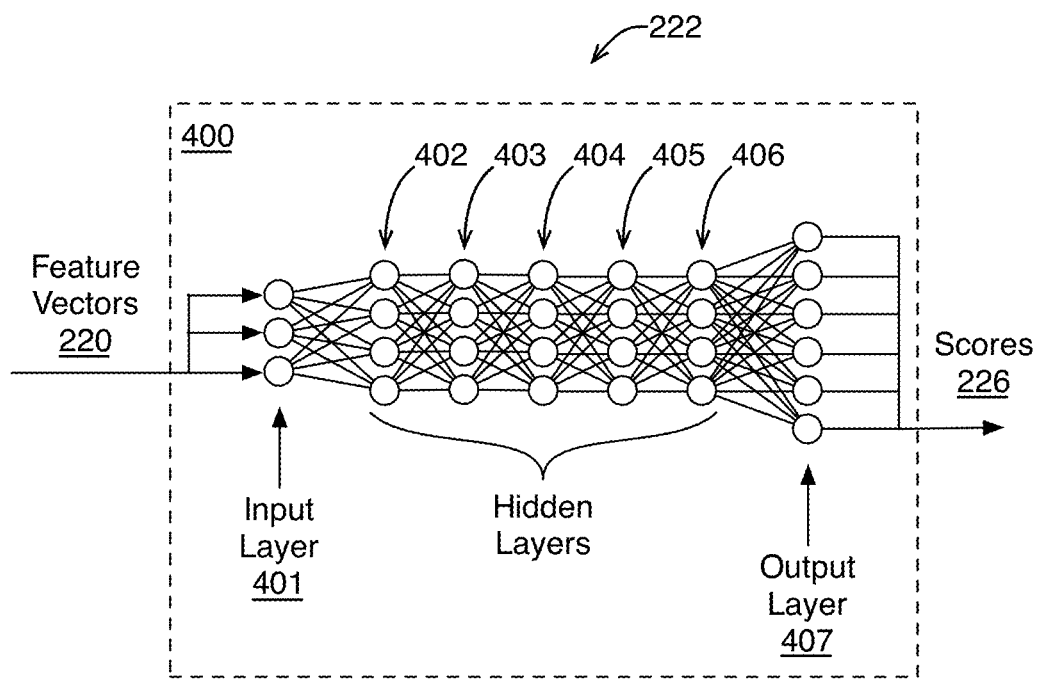
FIG. 4 illustrates an example acoustic model deep neural network.

Referring to FIG. 4, an example acoustic model neural network 400 may be arranged in accordance with at least some implementations of the present disclosure. For example, neural network 400 may be the structure for acoustic model 216 and may be implemented as NN unit 222 by acoustic scoring module 206 in some implementations. Neural network 400 may include any suitable neural network such as an artificial neural network, a deep neural network, a convolutional neural network, or the like. As shown in FIG. 4, neural network 400 may include an input layer 401, hidden layers 402-406, and an output layer 407. Neural network 400 is illustrated as having three input nodes, hidden layers with four nodes each, and six output nodes for the sake of clarity of presentation, however, neural network 400 may include any such input, hidden, and output nodes. Input layer 401 may include any suitable number of nodes such as a number of nodes equal to the number of elements in each of feature vectors 220. For example, input layer 401 may have 143 nodes corresponding to each of the 143 dimensions of feature vectors 220. In other examples, feature vectors may have fewer or more elements or dimensions and input layer 401 may have a corresponding number of nodes.

Furthermore, as in the illustrated example, neural network 400 may include five hidden layers 402-406. However, neural network 400 may include any number of hidden layers. Hidden layers 402-406 may include any number of nodes. For example, hidden layers 402-406 may include 1,500 to 2,000 nodes, 2,000 to 2,500 nodes, or the like. In some examples, hidden layers 402-406 have the same number of nodes and, in other examples, one or more layers may have different numbers of nodes. Output layer 407 may include any suitable number of nodes such that scores 226 include values corresponding to tied context-dependent triphone states, monophones, sub-phones, or the like. The tied triphone outputs of the DNN acoustic model are called Senones. In some examples, neural network 400 may implement Hidden Markov Models (HMMs) so that the outputs are outputs of tied triphone HMM-states. As discussed, in some implementations, output layer 407 may be pruned such that only predetermined output nodes (and associated scores 226), such as the triphones, are provided such that a subset of available states or scores are implemented via neural network 400.

Returning to FIG. 2, as discussed, scores 226 from acoustic scoring module 206 may be provided to log likelihood ratio decoder 204, where an output selection unit 224 provides (or provides access to) the correct rejection or keyphrase outputs to the correct inputs of the decoder models. This could simply be an automatic matter of routing an output from certain registers. Also, as shown, log likelihood ratio decoder 204 may also receive and implement a keyphrase model (or multiple keyphrase models) and a rejection model. For example, log likelihood ratio decoder 204 may receive a keyphrase model (or multiple keyphrase models) and a rejection model (e.g., keyphrase and rejection models 205) from memory.

Figure 5:
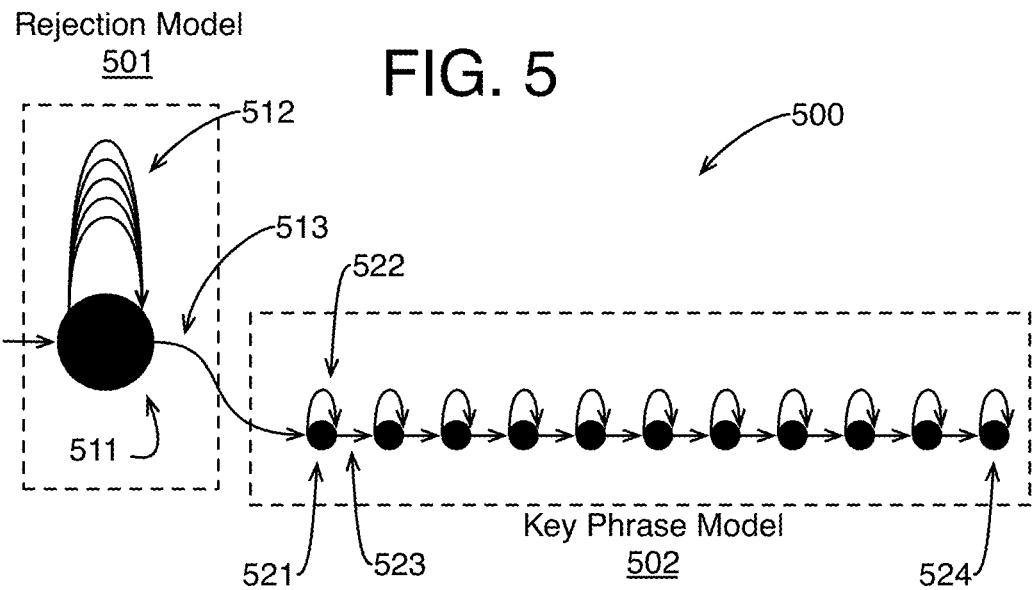
FIG. 5 illustrates an example rejection model and an example keyphrase model.

Referring to FIG. 5, an example keyphrase detection model 500 has a rejection model 501 and an example keyphrase model 502, arranged in accordance with at least some implementations of the present disclosure. As shown in FIG. 5, rejection model 501 may include a single state 511 and multiple self loops 512. For example, single state 511 may correspond to a start state and may provide a single start state based rejection model. Furthermore, each of self loops 512 may be associated with one of scores 226 (e.g., an output from acoustic scoring module 206) such that self loops 512 provide self updates or summing or the like for single state 511 of rejection model 501. For example, each of self loops 512 may be associated with a deep neural network output or output node that corresponds to a sub-phonetic unit. Using such techniques, single state 511 may provide a start state that implements a rejection model.

By one form, the acoustic model 216 of the acoustic scoring module 206 may not be pruned and, in such an implementation, self loops 512 may include thousands of self loops related to rejection states such as rejected (or non-keyphrase) speech, speech noise, silence, non-speech noise, or any combination of these. While the self loops 512 could include any number of self loops, however, the centerphone and contextphone techniques described herein are implemented to reduce the number of self loops 512, and describe particular operations to form the rejection scores or outputs for non-keyphrase speech (or spoken) states to be received and output by the self loops. In some implementations, acoustic scoring module 206 may be pruned and, in such implementations, self loops 512 may include significantly fewer self loops such as tens of self loops associated with likely rejection states and specific lexicon monophones (or phoneme or just phones) as described below.

In operation, at each time instance of outputs from acoustic scoring module 206, rejection model 501 may be updated to provide a rejection likelihood score associated therewith. For example, self loops 512 may illustrate updates to single state 511 at each time instance of outputs (e.g., scores 226) from acoustic scoring module 206. In an implementation, self loops 512 may each receive a rejection-related score that is an output of the acoustic model 400 or 216 as is discussed further herein. By one example form, the updating involves determining a maximum score among all of the scores occupying a self loop (or some other combination score of the self loop scores), and then summing that representative score with the previous single rejection state score.

Rejection model 501 having single state 511 may provide a greatly reduced rejection model 501 (e.g., in terms of memory and computational resources usage) as compared to conventional rejection models, which may implement many equally possible words or phrases or the like in parallel and may require Viterbi decoding with backtracking to provide for a most probable sequence to determine a rejection likelihood.

Also as shown in FIG. 5, keyphrase model 502 may be subsequent to rejection model 501 and connected by transition 513. Keyphrase model 502 may include multiple states 521 interconnected by transitions 523. Each of states 521 may include or be updated by one or more self loops such as self loop 522 and each of states 521 may be updated based on a transition of transitions 523 from a prior state in keyphrase model 502, or transition 513 from a prior state in the rejection model 501. For example, each self loop 522 (or arc) may be associated with or correspond to (or receive) an output (e.g., a score of scores 226) from acoustic scoring module 206 that is a keyphrase (targeted or desired) output. In the illustrated example, each of states 521 has a single self loop 522. However, one or more of states 521 may include multiple self loops. In some examples, one or more of states 521 may be silence states having self loops representative of silence such that keyphrases may be modeled that include silence. In this case, the silence states in the keyphrase model 502 may be used rather than having silence scores placed on self loops 512 of the rejection state 511 in the rejection model 501. One of the techniques described below adds additional silence states to the keyphrase model to reduce false accepts as described below. Keyphrase model 502 may include any suitable model.

By one approach, keyphrase model 502 may be one of a number of available keyphrase models where each model is based on a predetermined keyphrase. The keyphrase model 502 may be selected based on a lexicon look up, and the keyphrase model then may be implemented via system 200. In that case, a sequence of acoustic model outputs for the selected keyphrase model may be generated. For example, given a keyphrase such as "Hello Machine" or the like, based on a lexicon look up, the acoustic model outputs needed to form the sequence for "Hello Machine" may be determined, and such acoustic model outputs may be put together to form the recognition sequence. Thus, for example, transitions 523 between states 521 may be selected based on the triphone-HMM-state sequence in the lexicon.

Based on rejection model 501 and keyphrase model 502, at each or some time instances, a rejection likelihood score and a keyphrase likelihood score may be determined. For example, the rejection likelihood score may be a score associated with single state 511 of rejection model 501 and the keyphrase likelihood score may be associated with final state 524 of states 521 of keyphrase model 502. For example, rejection model 501 and keyphrase model 502 may be initialized with all nodes or states thereof at null or negative infinity or the like. With reference to FIGS. 3 and 5, based on a first feature vector $FV_1$, acoustic scoring module 206 may generate scores $S_1$, and single state 511 of rejection model 501 and a first state of keyphrase model 502 may be updated. The updating first may be performed by summing the score of the self loop state 522 and the transition 523 that is the previous score of the keyphrase state 521 to the left. By one form, the current score of the state 521 may be the maximum score sum between the summation just described for the current state and the same summation for the keyphrase state 521 to the left. This effectively creates a propagation operation or continual summing of scores from left to right through the keyphrase model. Upon a second feature vector $FV_2$ being processed, acoustic scoring module 206 may generate scores $S_2$, and single state 511 of rejection model 501 and a first and second state of keyphrase model 502 may be updated. Such processing may continue until final state 524 is updated from its initialization state to a meaningful scoring. At such a time instance (and subsequent time instances as updates continue), the score or probability or the like of single state 511 and the score or probability or the like of final state 524 may be used to determine whether the predetermined keyphrase has been detected. For example, a time series of keyphrase scores 228 may be generated by log likelihood ratio decoder 208 based on scores 226, rejection model 501, and keyphrase model 502.

Keyphrase scores 228 may include any suitable keyphrase score that compares the likelihood generated at single state 511 with the likelihood generated at final state 524. In an implementation, a keyphrase score of keyphrase scores 228 may be a log likelihood ratio. For example, a keyphrase score of keyphrase scores 228 may be determined as shown in the following Equation:

$$\text{KPS} = \log(p(X|\text{KeyPhrase})) - \log(p(X|\text{Reject})) \quad (1)$$

where KPS may be the keyphrase score, X may be the current accumulation of feature vectors being evaluated, and p provides a probability X is a member of KeyPhrase or Reject.

Returning to FIG. 2, as shown, controller 212 may receive keyphrase score 228 (e.g., a time series of keyphrase scores) and controller 212 may compare keyphrase score 228 to a threshold or the like to determine whether the predetermined keyphrase has been detected. For example, if keyphrase score 228 is greater than (or greater than or equal to) the threshold, the predetermined keyphrase has been detected and controller 206 may provide system wake indicator 230 to wake system 200. If keyphrase score 228 is less than (or less than or equal to) the threshold, the predetermined keyphrase has not been detected and controller 206 may not provide system wake indicator 230 and controller may continue to monitor keyphrase score 228. The provided threshold may be any suitable threshold. For example, the threshold may be varied to implement various levels of security and/or usability. For example, a low threshold may lower the required confidence (and may therefore have more false accepts) while a higher threshold may have fewer false accepts but a higher amount of false rejects in noisy conditions.

As discussed, the rejection self loops 512 may be arranged to expect scores of senones or certain triphones of speech or spoken rejected (non-keyphrase) outputs of the acoustic model. This may be performed to increase the accuracy (e.g., lower the false reject rate and false accept error rate) while reducing the number of rejection outputs, and in turn, rejection self loops 512 that are needed to reduce computational load, memory requirements, and power consumption.

Also, in some implementations, acoustic scoring model 216 may be pruned prior to implementation via system 200 so that only those scores expected by the keyphrase detection model, and herein specifically for the rejection-related outputs, are output by the acoustic model. Any other outputs of the acoustic model 216 not used by the keyphrase detection model are eliminated from the acoustic model. Furthermore, rejection model 501 and keyphrase model 502 may be generated based on the outputs (e.g., scores 226) available from pruned acoustic scoring model 216. Such pruning and model generation may provide a keyphrase detection model that provides low resource usage in terms of memory footprint, computational resources, and power usage. Such low resource usage may be advantageous in the context of wake on voice implementations, for example.

As discussed herein and as shown in FIG. 5, in some implementations, a single keyphrase model 502 may be implemented (e.g., for a single keyphrase). In other implementations, multiple keyphrase models (e.g., each associated with a different keyphrase) may be implemented. For example, each of the multiple keyphrase models may be subsequent to rejection model 501 and connected to rejection model 501 by a different transition in analogy to keyphrase model 502 being connected to rejection model 501 by transition 513. When multiple keyphrase models are used, the detection determination with the use of a threshold may be made as discussed above with a single keyphrase model.

Figure 6B:
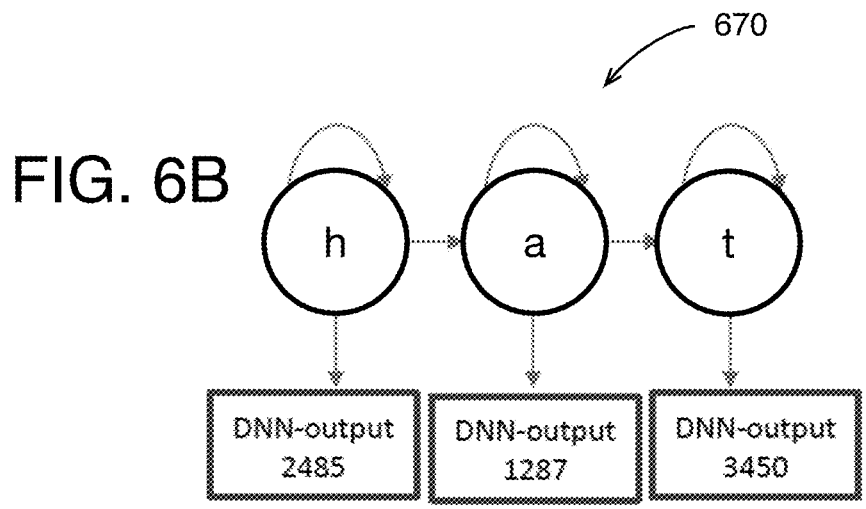
FIG. 6B is an illustrative diagram of an output triphone from an acoustic model deep neural network and with identification scores of each state in the triphone according to the process of FIG. 6.
Figure 6:
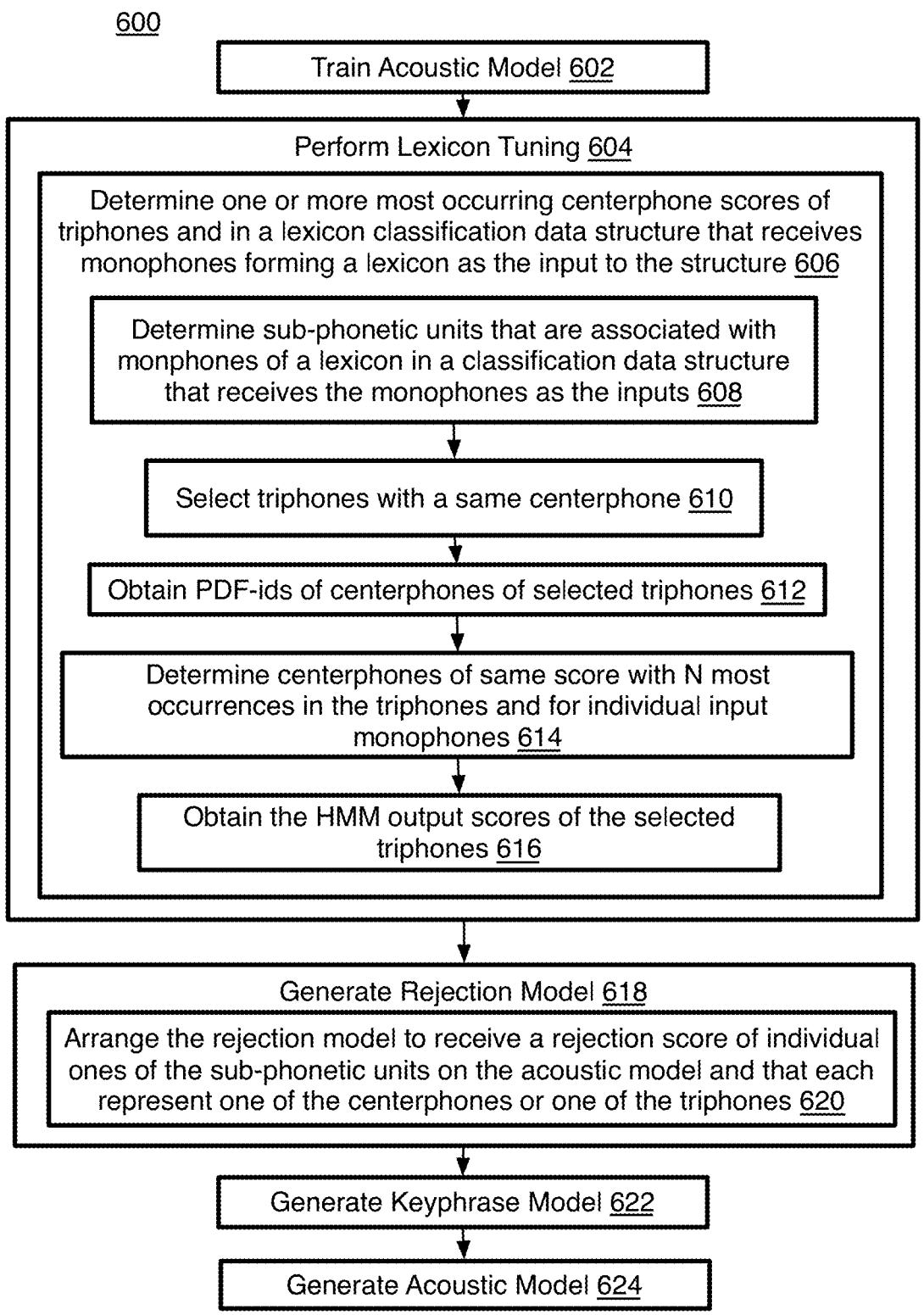
FIG. 6 is a flow chart of a method of high accuracy keyphrase detection for low resource devices and using centerphones according to at least one of the implementations herein.
Figure 6A:
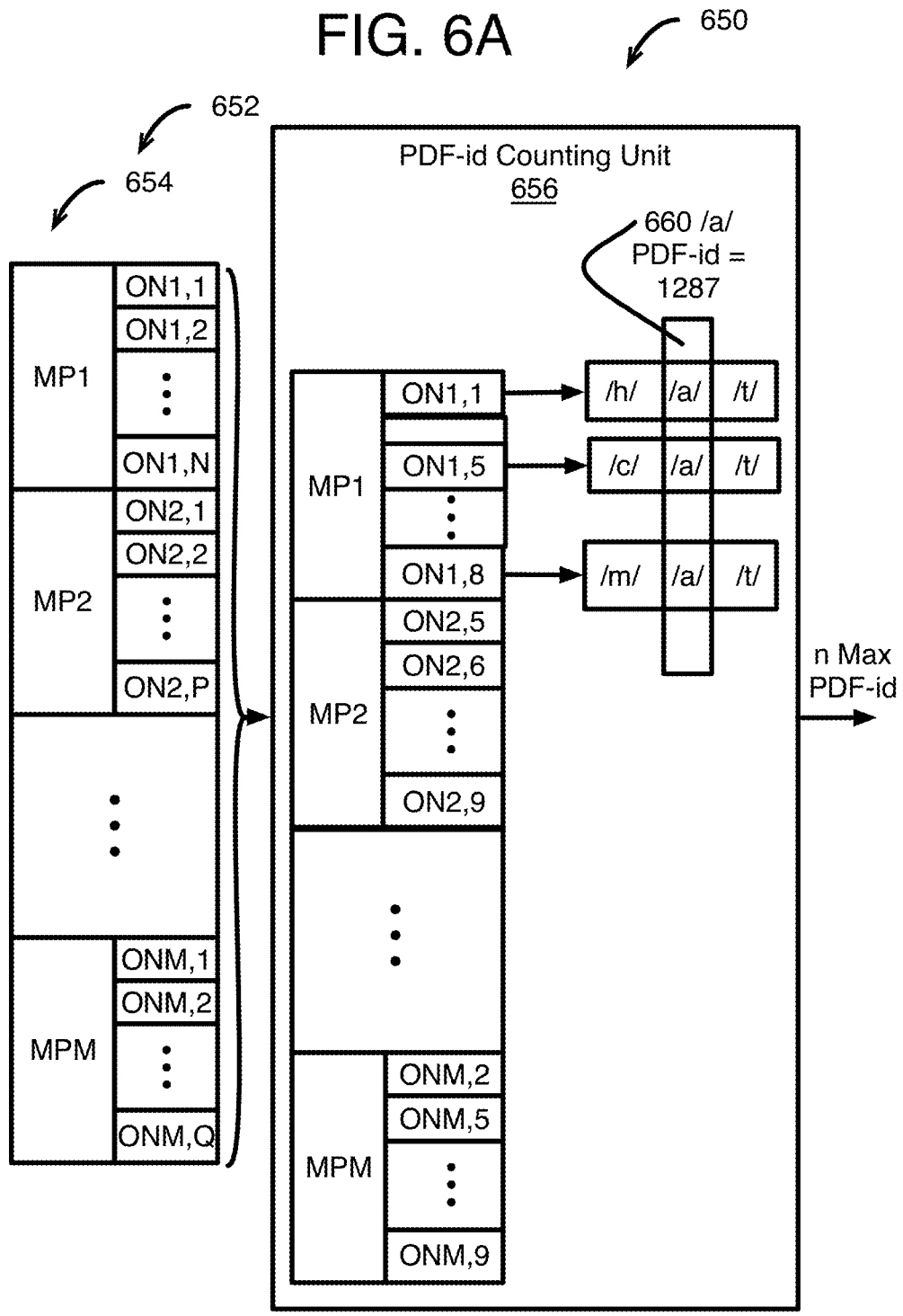
FIG. 6A is a schematic diagram of a data structure for generating rejection states to be placed on a rejection model in accordance with at least one of the implementations herein.
Figure 7:
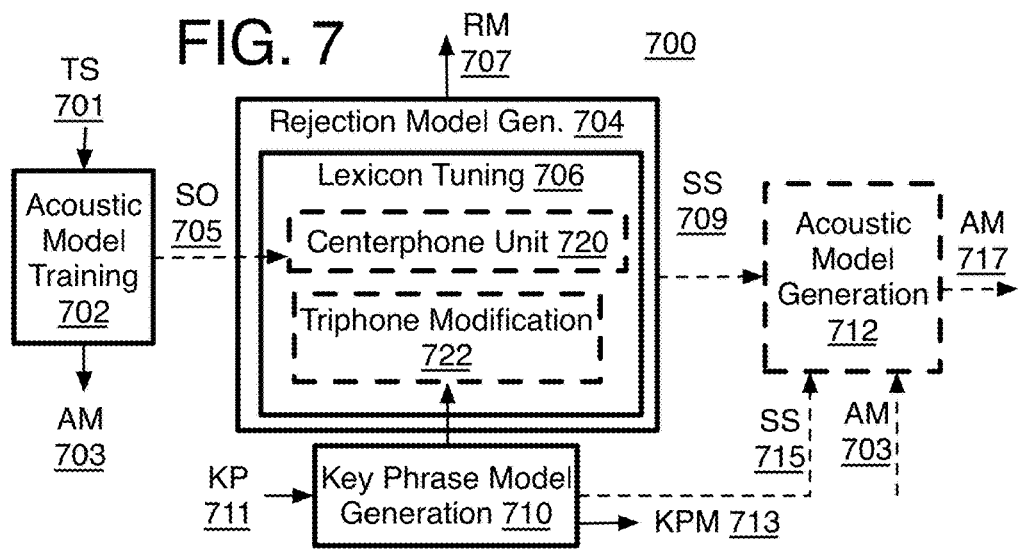
FIG. 7 is a schematic diagram of a system for performing a method of high accuracy keyphrase detection for low resource devices according to at least one of the implementations herein.

Referring to FIG. 6, an example process 600 for generating a keyphrase detection model is arranged in accordance with at least some implementations of the present disclosure, and specifically to provide a rejection model that is able to use a reduced set of non-keyphrase speech (or spoken) triphone rejection scores selected based on, or represented by, the centerphones of the triphones. Process 600 may include one or more operations 602-624 generally numbered evenly as illustrated in FIG. 6. Process 600 or portions thereof may be performed by a device or system (e.g., system 200, 700, 2000, or any other device or system discussed herein) to generate a keyphrase detection model. Process 600 or portions thereof may be repeated for any number of keyphrases (e.g., any number of predetermined keyphrases) to be used for detection via a device or system. Furthermore, process 600 will be discussed with reference to data structure 650 and system 700 as shown in FIGS. 6A and 7 respectively. For example, as used herein a keyphrase detection model may include a start state based rejection model, a keyphrase model, and an acoustic model.

Referring to FIG. 7, an example system 700 is provided for generating a keyphrase detection model, arranged in accordance with at least some implementations of the present disclosure. As shown, system 700 may include an acoustic model training unit 702, a rejection model generation unit 704 with a lexicon tuning unit 706, a keyphrase model generation unit 710, and an acoustic model generation unit 712. Furthermore, acoustic model training unit 702 may train an initial or starting acoustic model 703 based on a training set (TS) 701 and may generate sub-phonetic outputs (SOs) 705 that are to be used as the initial outputs of the trained acoustic model. The outputs 705 may be provided to rejection model generation unit 704.

While the rejection model generation unit 704 is shown to include the lexicon tuning unit 706, in some cases, the lexicon tuning unit 706 may be considered a separate module from the rejection generation unit 704. The lexicon tuning unit 706 may have a centerphone unit 720 that selects triphones or other sub-phonetic units for inclusion in the rejection model based on centerphones, and/or a triphone modification unit 722 that modifies keyphrase triphones based on context and for inclusion in the rejection model. The details are described below. These two options, alone or together, may form all or part of subset (SS) 709, and of available non-keyphrase rejection outputs of the acoustic model being trained as well as other rejection outputs, as is discussed further herein. Acoustic model training unit 712, rejection model generation unit 704, and keyphrase model generation module 710 may generate acoustic model (AM) 717, which may or may not be a pruned model, rejection model (RM) 707, and keyphrase model (KPM) 713, respectively, as is discussed further herein.

Returning to FIG. 6, process 600 may begin at operation 602, where an acoustic model may be trained. The acoustic model may include any suitable acoustic model such as an artificial neural network, a deep neural network, a convolutional neural network, or the like as discussed herein. For example, at operation 602, a neural network or model (e.g., having a set of available output nodes) may be trained based on a predetermined training set of audio input. For example, the full set of available output nodes may include output nodes corresponding to scores of sub-phonetic units such as tied triphone HMM-states as discussed herein. Furthermore, the full set of available output nodes may include output nodes corresponding to silence, noise, or the like. For example, acoustic model training unit 702 may train acoustic model 703 based on training set 701.

Process 600 may include "perform lexicon tuning" 604, and this refers to those operations to determine which sub-phonetic scores should be placed on the rejection model for non-keyphrase spoken sub-phonetics that are likely to be rejected as part of a keyphrase. To this end, process 600 may include generally "determine one or more most occurring centerphone scores of triphones and in a lexicon classification data structure that receives monophones forming a lexicon as the input to the structure" 606. A centerphone score here refers to a probability distribution function (PDF) id (or PDF-id) as one example. By one form, this operation determines at least one such centerphone with a score (or PDF-id) that occurs a maximum number of times among other occurrences of the same phone as a centerphone of tied triphones at the output nodes of a lexicon classification structure. The result is a maximum score centerphone for each monophone of the lexicon that is being used, and that can be placed on the acoustic and rejection models, or used to represent or compute a triphone score that will be placed on the acsoutic and rejection models.

Referring to FIG. 6A, the first part of this operation may be to "determine sub-phonetic units that are associated with monophones of a lexicon and based on tied HMM-state triphones in a classification data structure that receives the monophones as the inputs" 608. An example system or data structure 650 associated with generating a keyphrase detection model including a rejection model and keyphrase model is arranged in accordance with at least some implementations of the present disclosure. Specifically, the data structure 650 may be used by the centerphone unit 720 to determine the most occurring centerphone scores, where the centerphones are each associated with a different monophone of a lexicon. This data structure 600 may be, or include, a classification data structure such as a classification and regression tree (CART) that uses a classification tree 652. A lexicon or the like may include multiple monophones or phonemes 654 associated therewith (e.g., labeled $MP_1$, $MP_2, \ldots, MP_M$) that form the lexicon such /a/, /b/, /k/, and so on, and that is the input to the classification tree 652. For example, the pronunciation of a word or phrase in a language or lexicon may be represented as a series of individual units of sound, which may be characterized as phones, and a monophone (which is a phoneme) may be characterized as a single phone without context. A lexicon or language or the like may include any number of monophones 654. This input operation may be considered as iterating over the phoneme inventory. It should be noted that the entire inventory of phoneme or monophones MP may or may not be used here, and some subset of the monophones may be used instead of all of the monophones forming a lexicon. By one form, the monophones are input to the classification tree one monophone at a time, but in other forms, the monophones are input into the classification tree as a set or subset of the lexicon being used. Also, the CART tree may not be regular, and it could potentially also be a degenerated tree, which refers to the fact that the first level does not necessarily contain entries for all monophones.

The tree of the CART data structure 650 is generated in a data driven way. It may start at the root and then split according to questions. The questions are related to the context. A subset of the leaves or output nodes of the CART classification tree 652 are shown as ON MPm,i where m is the monophone (MP) number and i is for the output node number here shown for each monophone 654 separately. The output nodes ON may be in the form of sub-phonetic units, and here mainly tied triphone HMM-states so that three outputs or output nodes may form the triphone, but the output nodes could be other forms such as sub-phones, or single phones. For example, each output node may be, or have, a probability density function (PDF) score (or PDF-id) for the particular sub-phonetic unit forming the output node, and can be a single value that is a tied state of a triphone.

Process 600 then may include "select triphones with a same centerphone" 610 and where the centerphone is the same phone as one of the monophones of the lexicon. Thus, those output nodes ON on the classification tree 652 that have a centerphone of a triphone in the outputs or leaves of the CART that is the same phone (or in other words, the same sound, letter, or symbol) as the monophone are selected for each monophone. For the present method, each ONm,i shown for a MPm is a tied triphone HMM-state, and specifically a centerphone of a triphone. The centerphone is the same phone as the monophone MP except here with tied left and right phones on either side thereof. Thus, each monophone MPm is shown with a subset of its output nodes ON 1 to N that are each a centerphone or a second stage of a triphone, and with the same phone as one the monophone MP.

Process 600 then may include "obtain PDF-ids of centerphones of selected triphones" 612, or in other words, collect all PDF-ids of the centerphones of the selected tri-phones. Such PDFs may be obtained from separate state modeling as known with the use of CART data structures.

Process 600 then performs a counting operation based on statistics and performed by a PDF-id Counting Unit 656. Here, process 600 may include "determine centerphones of same score with N most occurrences in the triphones and for individual input monophones" 614. The PDF-id Counting Unit 656 may count the frequency of same PDF scores among the same centerphones of the selected triphones, where the output nodes with the same centerphone scores are listed here for convenience as ONm,i (such as ON1,1; ON1,5; and ON1,8 for MP1 at the counting unit 656 where for this example these /a/ centerphones all have a PDF-id of 1287). These are counted separately for each input monophone MP. Thus, this operation may include finding the single most occurrences of a centerphone for each possible phoneme or monophone. Otherwise, the second most occurrences, and/or third most occurrences, and so on, could also be used and provide centerphone scores (or triphone scores) for the rejection model and for each monophone MPm.

It will be appreciated here that the centerphone scores that are the same do not necessarily originate from a triphone with a unique set of tied triphone states. Specifically, in some examples that implement tied triphone HMM-states, an overlap may exist in the sub-phonetic units or output nodes. For example, the structure may be provided as follows: input Monophone→output triphone→sub-phonetic units per output (or leaf) which also can be the triphones. For example, the triphone h/a/t and the triphone c/a/n may each have a different set of three sub-phonetic units. However, the centerphone /a/ in both triphones might share the same sub-phonetic unit. In other words, while constructing the classification tree, the triphones may be tied based on acoustic properties. So, it is possible that the triphones c-a-t, h-a-t, b-a-t or even m-a-t are tied to the same second stage HMM state of their 3-state HMM. The result is that they all may have the same centerphone score and may be represented in the acoustic model by one output (one PDF) that is a triphone. Thus, the statistics which are analyzed show how often the particular PDF is observed or used, not necessarily how often a particular triphone is observed. This effectively adopts the notion that the centerphone is a good indicator of accurate rejection outputs.

So for the example shown on data structure (or system) 650 and as mentioned above, it may be found that the three triphones shown have the same centerphone PDF score (PDF-id of 1287) and are counted together (660) as a count of 3 occurrences for this centerphone /a/ with the specific same PDF-id. It should be noted that the output node ONm,i listed at the counting unit 656 only provides the centerphone PDF-id while the entire tied triphone is shown at the list or count 660 just to show the originating triphone that provided the centerphone. As mentioned above, different triphones may use the same centerphone due to state tying, where for example hat, cat, and mat share the same /a/ with the same PDF-id. This centerphone PDF-id is counted for each occurrence it is used at an output node or leaf of the lexicon classification data structure as described above. It also should be noted that there may be other centerphones /a/ with a different PDF score that are counted separately from this count 660. By one form, a centerphone PDF-id is determined with the most occurrences for each input monophone $MP_1$ to $MP_M$. By other forms, only selected ones of the input monophones may have a determined triphone. By one form, there may be about 24 centerphone PDF-ids that are determined from the data structure 650 and corresponding to 24 monophones, and that are to be used as rejection output scores, part of rejection output scores, or used to compute the rejection output scores.

This process may be repeated for each monophone being analyzed so that once a centerphone with a maximum occurrences of a PDF-id is determined for a monophone, the maximum occurrence PDF-id for the next monophone may be determined until each monophone has a maximum centerphone PDF-id that is to be used on the rejection model.

It should be noted that the operation of the data structure 650 also will be understood to operate separately from the acoustic model such that propagation of data through the classification tree is separate from propagation of data through the acoustic model, and the leaves or outputs of the data structure are not necessarily always the same as the acoustic model.

Referring to FIG. 6B, process 600 then may include "obtain the HMM output scores of the selected triphones" 616. Thus, the selected or determined triphone, or subset of outputs or triphones from the data structure of classification tree, is matched to the same triphone output on the acoustic model. The PDF score from the data structure is used as the acoustic score for the centerphone of the triphone on the acoustic model. For example, an acoustic model sub-phonetic unit (here a triphone) 670 shows HMM states for the triphone /h/a/t/, i.e. center-phone /a/ has a left context /h/ and right context /t/. The example HMM-outputs may be DNN-IDs 2485, 1287 and 3450. Assuming that the triphone /h/a/t/ was the most observed triphone with /a/ being centerphone, the centerphone DNN-output 1287 is selected as the rejection score (or rejection density) for /a/. In other words, while the DNN IDs of the left and right context are from the acoustic model propagation, the ID of the centerphone /a/ is the PDF score (PDF-id) from the data structure. By one form, all three DNN-ID values may be provided to the rejection model as output scores for the triphone, or alternatively may be used to compute a single rejection score for the triphone such as by using an average, sum, or other combination. By an alternative form, it is only the score (the DNN-ID or PDF-id) of the centerphone that is provided as the score for the entire triphone and to the rejection model. By another option, a three-state rejection mimics a single triphone state.

Next then, process 600 may include "generate rejection model" 618, where a rejection model may be generated based on the subset of selected triphones from the output nodes of the data structure. This may include "arrange the rejection model to receive a rejection score of individual ones of the sub-phonetic units on the acoustic model and that each represent one of the centerphones or one of the triphones" 620. For example, the rejection model may include a start based rejection model having a single state and self loops at least some of which are individually associated with one or more of the selected triphones generated via operations 604 to 616 as discussed with respect to FIG. 6 and elsewhere herein. For example, rejection may be performed in a start or first state of a recognition graph by a self loop of tied triphone HMM states. Also, the rejection model may include self loops corresponding to speech or spoken states such as the non-keyphrase rejection triphones (e.g., HMM states) from the output nodes of the data structure, and for each monophone. The rejection model also may provide self loops corresponding to spoken noise as well as non-speech (e.g., non-spoken states) such as silence and non-spoken noise. By one form, the result is that the final rejection model may have as many non-keyphrase spoken rejection outputs as there are phonemes in the inventory for the lexicon being used.

Process 600 may include "generate keyphrase model" 622, where a keyphrase model or models may be generated. For example, the keyphrase model may be generated to include a multi-node or multi-state lexicon look up keyphrase model having transitions between each state and/or self-loops of each state associated with one or more of the output nodes as discussed with respect to FIG. 5 and elsewhere herein. For example, with reference to FIG. 7 the generated keyphrase model (e.g., keyphrase model 713) may include a subset (e.g., subset 715) of the output nodes of acoustic model 712 (although there may be overlap as well) that correspond to keyphrase sub-phonetic units that indicate a likelihood that a keyphrase, or part of a keyphrase, is detected.

Process 600 may continue with "generate acoustic model" 624, where a model may be generated based on the subset(s) of selected rejection triphones from the output nodes of the data structure 650 for example. For example, with reference to FIG. 7, acoustic model generation module 712 may receive subset 709, subset 715, and acoustic model 703. The acoustic model is then modified by placing sub-phonetic units, or more specifically probability scores of the sub-phonetic units, of the subsets onto the output nodes of the acoustic model. Thus, the two subsets of the output nodes of acoustic model 712 (e.g., subset 709 used in rejection model 707 and subset 715 used in keyphrase model 713) may define the speech related output nodes needed in acoustic model 719. The rejection and keyphrase generation also may provide separate rejection and keyphrase models with outputs to provide the acoustic model separate output nodes associated with silence, background noise, or the like. Then, probability scores for these rejection categories may be provided to the acoustic model to provide these rejection states on the acoustic model.

By one approach, the acoustic model also may be pruned so that spoken non-keyphrase rejection related output nodes that are not one of the selected triphones form the data structure are eliminated or ignored to reduce the computational load and to thereby provide for a low resource acoustic model during implementation. The pruned acoustic model may be implemented (e.g., scored) for keyphrase detection as discussed herein. Such pruning may provide for a substantially smaller acoustic model for implementation, which may save further on resources (e.g., power, computational, memory, or the like). For example, the number of rejection outputs may be reduced from about 100 rejection outputs from known systems to about 39 rejection outputs using the solutions disclosed herein, and where each input monophone or phoneme in the inventory of the lexicon used on the data structure herein has one output on a self loop of the rejection model (although each such phoneme could have more than one). The subset of acoustic model outputs used for the keyphrase model also may be used to prune the original acoustic model such that accepted keyphrase acoustic model outputs that are not to be used are discarded as well.

Referring to FIG. 8, as to testing of the centerphone technique described herein, Table 1 compares the False Rejection Rate (FRR) of the centerphone rejection with the FRR of a conventional rejection model without reduction of the number of rejection outputs (self loops). The right-most column shows the FRR reduction in % (the greater the negative value, the better the improvement). Table 1 is divided into three sections where the first rows (starting at "clean") shows results on artificial data at different SNR levels, the rows starting with "clean 50 cm" shows results on the same data in re-recorded close-talk (50 cm) scenarios, and the rows starting with "clean 400 cm" shows results achieved on far-field (4 m) settings. The detection thresholds of the two systems shown were selected to provide 1 false wake in 100 h of arbitrary speech in order to allow an apple-to-apple comparison on one error measure. As mentioned above, the improvement is an average reduction in FRR of about 36%.

Figure 9:
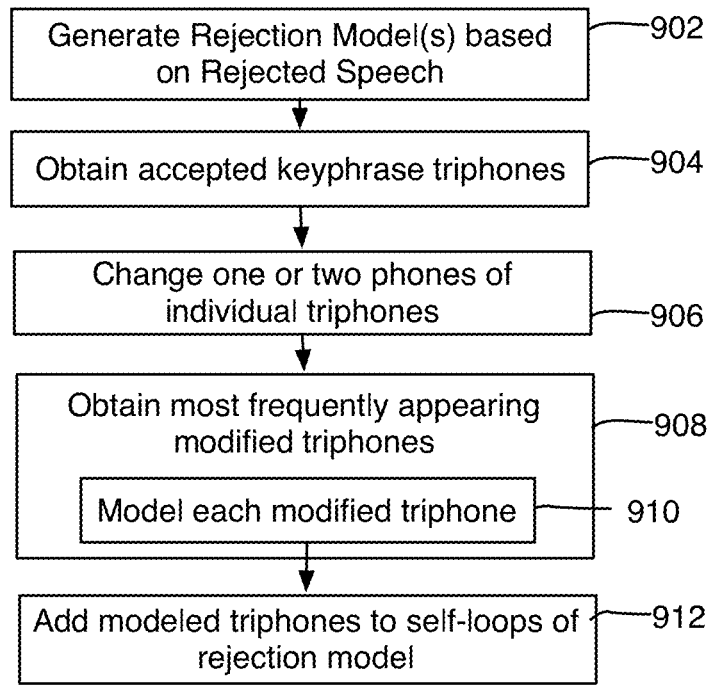
FIG. 9 is a flow chart of another method of high accuracy keyphrase detection for low resource devices and using context-related phones according to at least one of the implementations herein.

Referring to FIG. 9, an example process 900 for generating a keyphrase detection model is arranged in accordance with at least some implementations of the present disclosure, and specifically to provide context-related rejection outputs in a contextphone rejection process. Process 900 may include one or more operations 902-912 generally numbered evenly as illustrated in FIG. 9. Process 900 or portions thereof may be performed by a device or system (e.g., system 200, 700, 2000, or any other device or system discussed herein) to generate a keyphrase detection model. Process 900 or portions thereof may be repeated for any number of keyphrases (e.g., any number of predetermined keyphrases) to be used for detection via a device or system. Furthermore, process 900 may be discussed with reference to systems 700 as shown in FIG. 7.

Process 900 may include "generate rejection model(s) based on rejected speech" 902. As already described above with FIGS. 5 and 7, a start state based rejection model may be generated that has a single rejection state and comprises a plurality of rejection model self loops each associated with a particular rejection score of the sub-phonetic units of the output nodes of the acoustic model. This may include both speech (spoken rejection scores and spoken noise scores) and non-speech (silence scores and non-spoken noise) related rejection scores and corresponding self loops on the rejection model. The spoken rejection scores may or may not include non-keyphrase spoken rejection scores of triphones selected by using the centerphone-related technique already described above. By one approach, the context-related technique of process 900 provides rejection scores to add to the rejection model in addition to the centerphone-related rejection scores when present.

Figure 10:
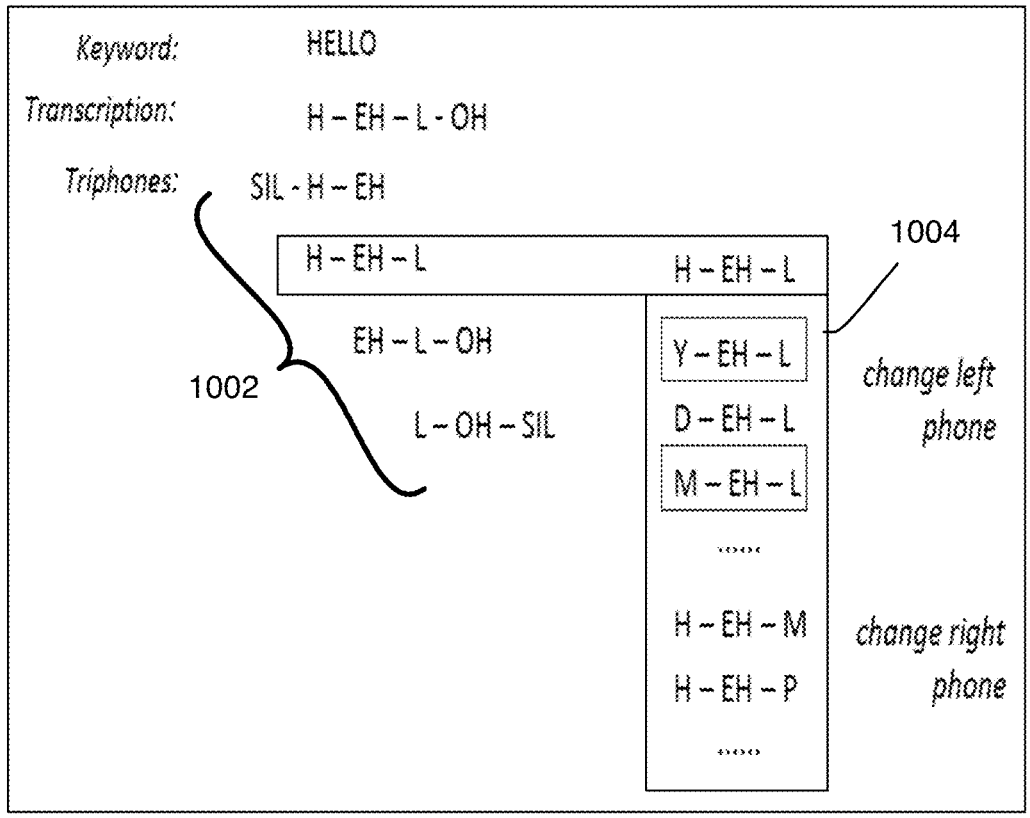
FIG. 10 is a textual diagram to explain contextphones according to the process of FIG. 9.

Referring to FIG. 10, process 900 may include "obtain accepted keyphrase triphones". This involves breaking down keywords of the keyphrases into triphone sequences. An example phonetics diagram 1000 is shown for the word "HELLO" to form the context-related (or contextphone) rejection triphones, and the analysis here is the same or similar for each keyword that is being analyzed for contextphones. The word HELLO is broken down into a triphone sequence 1002 as shown (and where SIL refers to silence): SIL-H-EH, H-EH-L, EH-L-OH, L-OH-SIL. Alternatively, this could be performed by using sub-phonetic units of different lengths than the triphones for the initial sub-phonetic sequence and/or for the resulting modified sub-phonetic units, such as bi-phones, mono-phones, four-phones, and so forth, and alternatively triphones cold be modeled using any desired numbered of states, such as 1 to 5, or more states.

Also for selecting triphones similar to the desired keyphrase, several other approaches could be used. One would be to first base the similarity on words. Then similar words are selected from the lexicon, and the triphones are selected based on these words. The similarity of words can be measured for example with an approach such as Levenshtein distance. Another approach would be to build a phoneme confusion matrix, and then build the "modified" triphones based on this confusion matrix by using triphones that can easily be confused.

Then, process 900 may include "change one or two phones of individual triphones" 906. Each triphone in the triphone sequence is then modified. By the example shown, a modification box 1004 shows one form where the triphone H-EH-L from HELLO is modified by changing the left or right phone as shown. By this example, only the left phone or the right phone or both is changed. By yet other examples, only the centerphone may be changed, or the centerphone may be changed with changes to one of the left or right phones. By yet other options, only vowels or consonants are changed. Otherwise, any combination of these may be used, and it also may depend on the length (number of phones) when sub-phonetic units of different length than triphones are being used or when the lengths vary for example.

Next, process 900 may include "obtain most frequently appearing modified triphones" 908, where statistics can be generated to count the number of times the modified triphones appear in the training set (711 FIG. 7, for example) used to generate an initial acoustic model. This also may be considered the modeling of each modified triphone (910) where the method obtains senones for the triphones and the PDF scores for the triphone. By one form, this is performed for the N most occurring modified triphones, and is only limited by the number of self loops that can be added to the rejection model considering the balance between computational load and accuracy, where the more context-related rejection scores added to the rejection model, the greater the increase in accuracy of the keyphrase detection. However, while the more DNN-ouputs are added to the system (to the rejection model), the stronger the rejection and the more restrictive the system, a too strong rejection model might may have negative effects in noisy conditions for example. In the continuing example, Y-EH-L and M-EH-L are selected as most frequently appearing. This also involves entering the resulting triphones into the acoustic model.

Otherwise, all modified triphones of a keyword could be changed, or the modified triphones could be selected to be changed depending on some other criteria such as PDF score. BY yet other alternatives, instead of basing the rejection on all triphones, only triphones of vowels could be selected for example, and then the system may use the top-N occurrences of them instead of the top one occurrence, or all three DNN-outputs per vowel triphone could be used instead.

Process 900 may include "add modeled triphones to self loops of rejection model" 912. In the given example, triphones such as "Y-EH-L" and "M-EH-L" are selected, and by one form, in an automatic process performed without user intervention. The result is a much more robust model that can reject many common words similar to the keyword (here for example, "YELLOW" or "MELLOW" when the keyword is HELLO).

The contextphone method may be fully automated and independent of specific keywords (in other words, it is not limited to certain keywords). The contextphone process 900 can be performed as long as the transcription of the keyword and the linguistic statistics derived from the training set (i.e. senone counts) are available. The contextphone process 900 may remove much unwanted or false positive detection on words similar to the keyword without harming the recognition rate for true keywords.

Figures 11, 12:
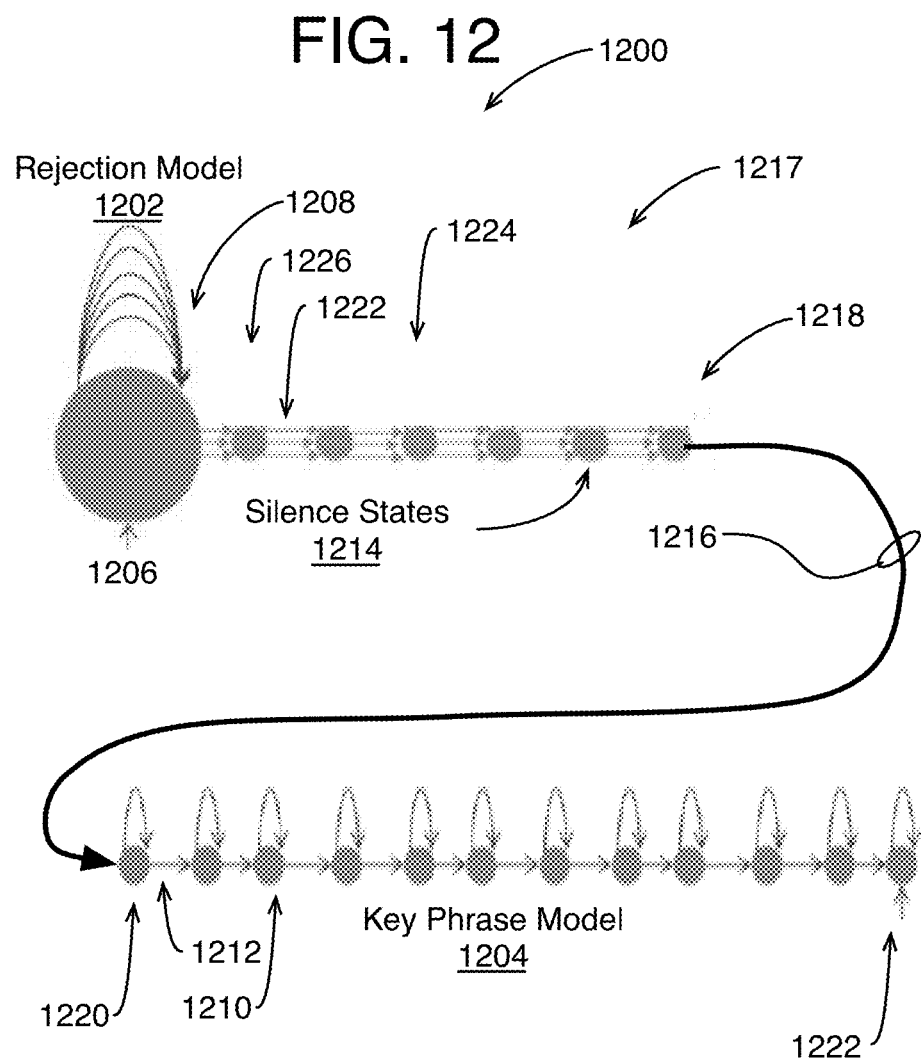
FIG. 11 is a Table 2 showing results of the context-related phone technique according to the process of FIG. 9
FIG. 12 is a schematic diagram of a decoding model, added silence states, and a keyphrase model for keyphrase detection according to at least one of the implementations herein.

In experiments for this contextphone rejection method and while referring to FIG. 11, a Table 2 shows a reduction of false acceptance rate for non-keyphrases similar to the keyphrases by modifying the keyphrase triphones with changed left or right phone. This experiment was conducted for the keyphrase "Hey Lenovo" in Chinese Mandarin. The false rejection rate (FRR) is measured on a corpus of 220 phrases recorded on a lab device. The false wakes in podcasts are measured on a corpus of 85 hours of Chinese podcasts recorded on the device. For testing the resistance against similar phrases (or sub-words of the keyphrase), the test employed a corpus of 300 problematic utterances delivered by the customer. For both the baseline rejection method and the disclosed method 900, the threshold is set in such a way that the test obtained 1 false wake in 10 hours of podcasts. The context-related method yields a reduction in acceptance rate for similar phrases from 24.7% to 9.3%. By strengthening the rejection model, the contextphone method also yields an improvement in FRR from 2.64 to 1.32% (less is better).

Referring to FIG. 12, adding silence in the decoding sequence either to the beginning or end of a keyphrase will assist with reducing false positives where the keyphrase is heard in the middle of a sentence, such as the garlic sauce example mentioned above. This makes the phrase sequence longer and relatively harder to detect. As a side effect, this adds the requirement for the user to pause to add the silence to the keyphrase model which may be more intuitive for the silence to be before the keyphrase rather than after the keyphrase depending on the keyphrase content. Thus, while an additional silence after the keyphrase is possible, it may have an effect on the user experience where the user may need to utter a silence between a wake up phrase and a command, e.g., "Alexa [pause] please tell me the weather".

Turning to the example of the decoder or keyphrase detection model 1200, many of the components and operation are the same or similar to that of decoder or model 500 (FIG. 5) and need not be repeated here. As shown here, a rejection model 1202 is similar to rejection model 501 and has a single state 1206 with multiple self loops 1208. A keyphrase model 1204 has multiple states 1210 with transitions 1212 between them all as described above with decoder 500. Here, however, silence states 1214 (or a silence model 1217) are added after the rejection model 1202 and before the keyphrase model 1204 along the flow of data via the transitions from state to state, and here for this example, from left to right. A transition 1216 provides values from a last silence state 1218 to a first keyphrase state 1220, although the silence states 1214 may be considered a part of the keyphrase model 1204.

The silence states 1214 have multiple transitions 1222 between each of the silence states and multiple self-loops (states itself) 1224. During training of a senone-based deep neural network (DNN), silence is not trained as a simple state, but with a more complex structure, where each transition may be trained based on different background noise for example, or in other words, each silence state has multiple DNN-outputs each being associated with silence and each being associated with a different audio environment within a group of parallel transitions. This achieves a more detailed modeling of silence in various noise conditions. Modeling of complex structures are then possible. For efficiency, a Bakis topology may be used for modeling silence.

Thus, when scoring or updating the silence model, each transition may contribute a different silence output to the next state 1214. However, the silence states 1214 are updated with one of the selected transition output scores coming from the state to the left, such as a maximum or highest silence output, or may be a combination of them such as an average.

By one form, the self loops 1202 include multiple silence self-loops that update the transitions 1222. The rejection model 1202 would be required to provide a minimum silence to the transitions 1222 to ensure silence is added to the front of the keyphrase. Alternatively, the rejection model 1202 could have self loops that receive scores for each of the transitions within the parallel transitions although it is not necessary.

As to the transition from the last silence state 1218 to the keyphrase states, the last silence state 1218 provides the state value to the first keyphrase state 1220.

In order to set the duration of the silence, the number of silence states indicate a certain silence duration so that adding or removing silence states 1214 will change the duration of the silence. Continuously decoding the model as time passes, and for each additional silence state, requires the lengthening of the keyphrase sequence to be one time-shift longer. Each time shift or step may be about 10 ms. Particularly, duration of silence is selected experimentally and depending on a duration of silence that produces the best overall results (in FRR and/or FA for example). For example, 200 ms of silence results in an additional 20 states in, or before, the key phrase model at 10 ms per state.

The input of silence scores for the silence states 1214 operates the same as that described with the keyphrase states of decoder 500 such that the self loops 1208 of the rejection model 1202 include loops for silence and that will receive the silence scores from the acoustic model, and by one form, this will result in each of the silence states 1214 receiving the same silence scores from silence state to silence state. The transitions may be repeated from left to right from the first silence state 1226 receiving a transition value from the self-loops of the rejection model 1222 to the last silence state 1218 that provides a state value to the first keyphrase state 1220. As with decoder 500, a rejection likelihood score from rejection state 1206 and a keyphrase likelihood score from the last keyphrase state 1222 may be used to make a keyphrase detection determination, such as by using the difference between the two values as a final score to be compared to a threshold.

Figure 13:
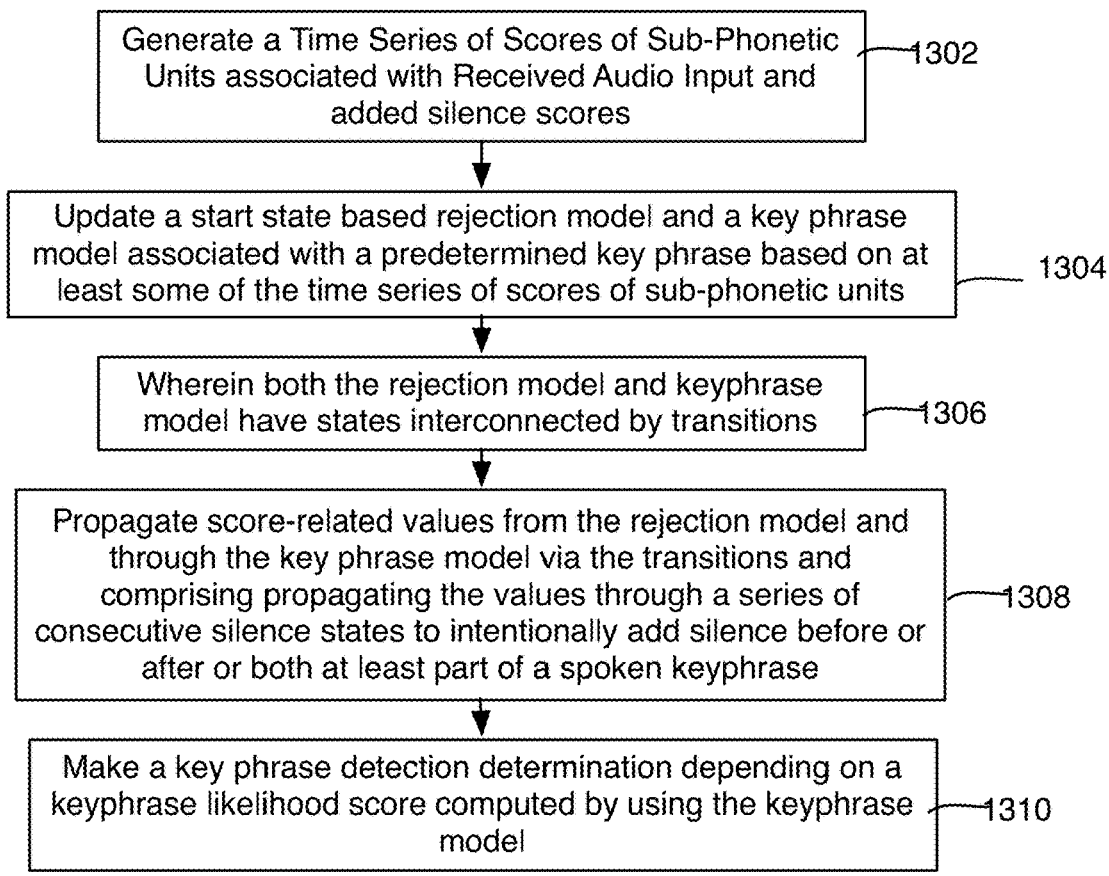
FIG. 13 is a flow chart of an example process for keyphrase detection using added silence according to at least one of the implementations herein.

Referring to FIG. 13, a process 1300 for an example process 1300 for generating a keyphrase detection model is arranged in accordance with at least some implementations of the present disclosure, and specifically to operate a keyphrase detection model with added silence. Process 1300 may include one or more operations 1302-1310 generally numbered evenly as illustrated in FIG. 13. Process 1300 or portions thereof may be performed by a device or system (e.g., system 200, 700, 2000, or any other device or system discussed herein) to generate a keyphrase detection model. Process 1300 or portions thereof may be repeated for any number of keyphrases (e.g., any number of predetermined keyphrases) to be used for detection via a device or system. Furthermore, process 1300 may be discussed with reference to decoder 500 or 1200 as shown in FIG. 5. or. 12.

Process 1300 may include "generate a time series of scores of sub-phonetic units associated with received audio input and added silence scores" 1302, and as described with acoustic models herein, where the acoustic model may have spoken and non-spoken related scores as described above and computed from received audio input. As to silence, silence is described as a phonetic unit on the acoustic mode the same as other phones. Thus, silence depends on context, location (e.g., begin, end, intermediate section of a key phrase) or noise (non-spoken noise) where silence can produce different pdfs. No need exists to explicitly add silence to the acoustic model to use the added silence on the rejection and/or keyphrase model. During training of the acoustic model, silence outputs are defined by HMM structures and trained implicitly during acoustic model training as usual.

Process 1300 may include "update a start state based rejection model and a keyphrase model associated with a predetermined keyphrase based on at least some of the time series of scores of sub-phonetic units" 1304, and where the rejection model and keyphrase model are updated as described above. It will be understood this also may include updating alternative keyphrase models when multiple alternative keyphrases can be detected.

Process 1300 may include "wherein both the rejection model and keyphrase have states interconnected by transitions" 1306, and this refers to the transitions 1212, 1216, and 1222 of the decoder 1200 for example, and that carry the score-related values from one state to another. This may include the multiple parallel transitions of the silence states whether each parallel transition is handled separately or not at a single transition point. The multiple scores of parallel transitions may each have a self loop at the rejection model, and the last silence state may combine the scores related values of multiple parallel transitions to form a single transition to the keyphrase states of the keyphrase model as explained above with decoder 1200.

Process 1300 may include "propagate score-related values from the rejection model and through the keyphrase model via the transitions and comprising propagating the values through a series of consecutive silence states to intentionally add silence before or after or both at least part of a spoken keyphrase" 1308. Thus, a series of silence states such as silence states 1214 may be provided to lengthen the keyphrase and provide better differentiation with non-keyphrases that are similar to the actual keyphrases. By one form, multiple or all silence states receive the same scores from one or more acoustic models and at self loops of the silence states, where each silence state has multiple self loops as described above and that may be associated with a single transition of the parallel transitions, or that may be combined to form a single value from the self loops on a single silence state. The number of consecutive states sets the silence duration and may be predetermined also as described above with decoder 1200.

Process 1300 then may include "make a keyphrase detection determination depending on a keyphrase likelihood score computed by using the keyphrase model" 1310, and as described above with decoder 500.

Referring to FIG. 14, a Table 3 provides results comparing models without extra silence to models with 250 ms of silence added to a key-phrase model described herein. Score degradation is shown in % for similar phrases generated on a version of one example key-phrase model when requiring 250 ms of silence. The first column contains identified phrases that are similar to first example keyphrase on a 100 h podcast set that were tested here, the second column contains the keyphrase likelihood score that shows the probability that the audio input (unwanted phrase) is the keyphrase and achieved with the non-silence model, and the third column shows the scores achieved by the model with extra 250 ms silence in front of the key-phrase. The fourth column shows the score reduction in %. On average, the score of unwanted phrases is reduced by 28%. In some cases, differences between the methods are between 35-50%. Maximum value is 65.08% and average of deltas for this sample of data is ~25%. The results show that additional silence decreases scores for similar non-keyphrases and decreases the probability of performing false wakes, especially when a similar non-keyphrase speech segment is inside another word or sentence such as for the "garlic sauce" example described above.

Referring to FIG. 15, a Table 4 shows the difference of real false wakes on a set of 85 hours (85 h) of arbitrary speech among two variants of longer silence (500 ms and 750 ms) compared to an initial model without extra silence. Evaluations have been done on the same key-phrase model as described above. During evaluation, a WoV system was consuming audio data continuously; no additional VAD was involved. Data contains 85 hours of different podcasts. The values are shown for several different thresholds (first column).

Figure 16:
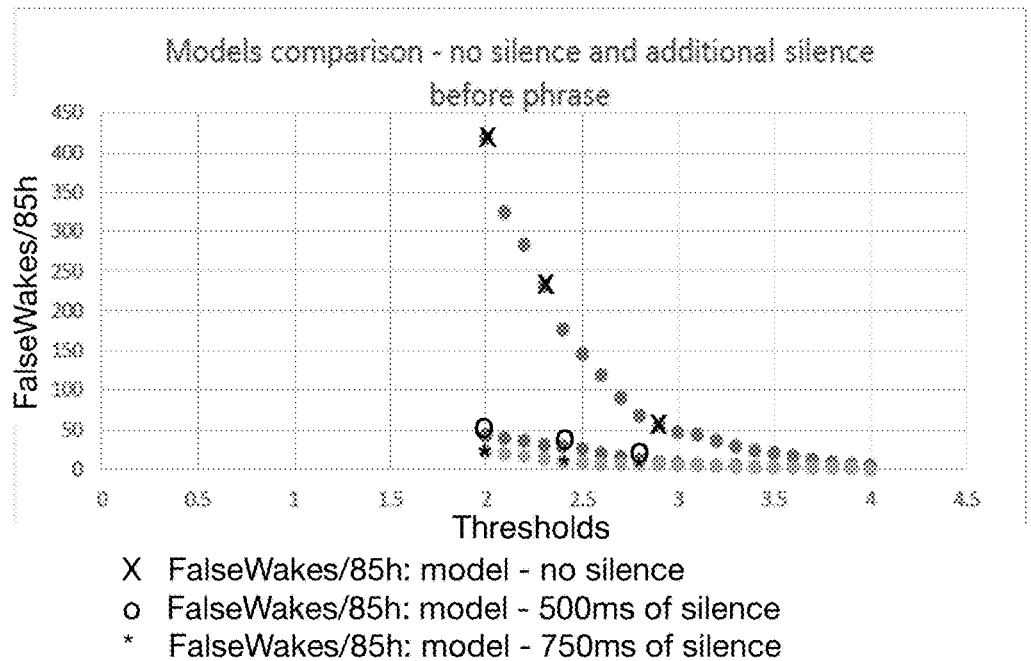
FIG. 16 is a graph comparing results of decoders with different lengths of silence according to at least one of the implementations disclosed herein.

Referring to FIG. 16, the values of Table 4 are graphed. Requiring silence in front of the keyphrase is shown to assist significantly in reducing false wakes. This is especially true with corner cases (see Table 2) which are dramatically reduced.

As mentioned above, the three solutions described herein (centerphone, contextphone, and added silence) can be used separately or together in any combination. When silence modeling and centerphone selection is combined to work together and improve speech recognition, the methods do not affect complexity of computation or model sizes. Thus, this is a good way to improve ASR systems on devices where memory is limited, or low power consumption is required.

Figures 17, 18:
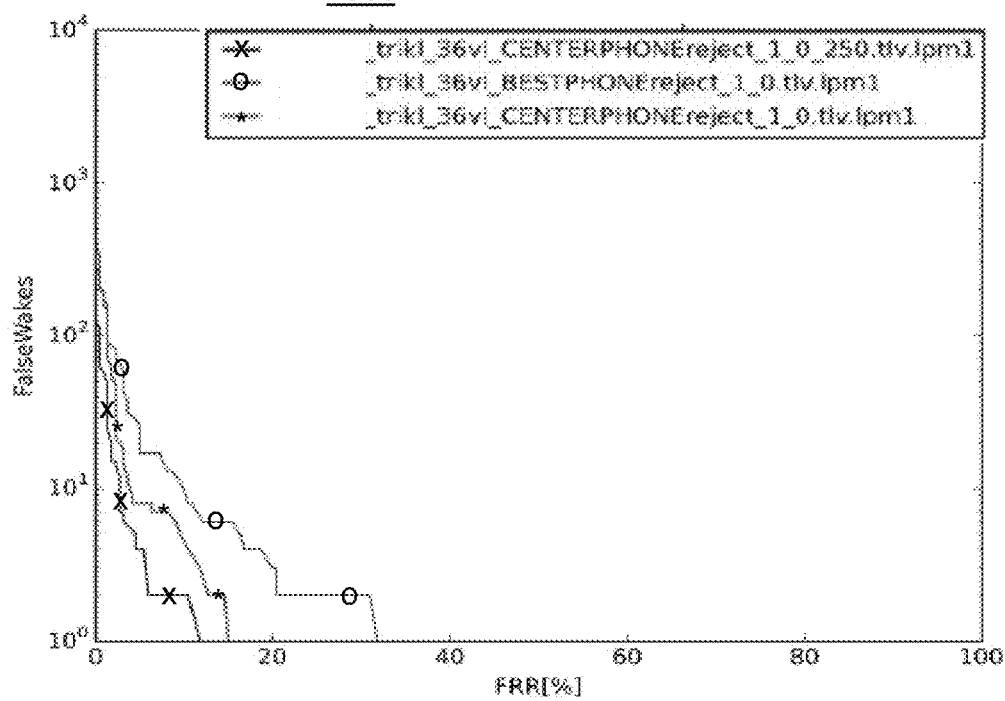
FIG. 17 is a Table 5 showing results obtained by using a combination of the keyphrase detection methods disclosed herein.
FIG. 18 is a graph comparing the results of different combinations of keyphrase detection methods disclosed herein.

Referring to FIG. 17, a Table 5 provides a comparison of (1) a conventional bestphone technique described above that simply uses a triphone with most occurrences alone, (2) centerphone technique alone, and (3) a combination of centerphone and added silence. The results show a decreasing false reject rate from techniques (1) to (3) and on a certain number of false wakes. In this case, 12 false wakes (12 fws/85 hours). This was performed for two clean samples with one having the source 3 ft away and the other having the source 9 ft away. The experiment was done on 85 hours of English podcasts and clean re-recorded utterances in the 3 variants (techniques).

Referring to FIGS. 18-19, the results of Table 5 are graphed. BestPhone selection is shown in 0 line, centerphone alone selection is shown in * line, and the combination of centerphone and additional silence before a keyphrase is shown in X line. The graphs show that the two methods disclosed herein reduce error rate and improve the rejection process. Specifically, the graphs show that the centerphone alone selection has better error rate than the traditional (best phone selection) method, and combination of centerphone and added silence give even better results. The methods together decrease false reject rate and decrease number of false wakes in this case.

Referring to FIG. 20, an example system 2000 for performing keyphrase detection and/or generation of a keyphrase detection model according to the implementations described above is arranged in accordance with at least some implementations of the present disclosure. As shown on FIG. 20, system 2000 may include a central processor 2001, ASR processor(s) 2002, a memory 2003, and microphone 202. Also as shown, central processor 2001 may include acoustic model training module 2004, rejection model generation module 2005 (which may be the same as rejection model generation unit 704), keyphrase model generation module 2006, and acoustic model generation module 2007. Furthermore, ASR processor 2002 may include feature extraction module 204, acoustic scoring module 206, log likelihood ratio decoder 208, and controller 212. In some implementations, processor 2002 also may include voice activity detection module 214. Also as shown, memory 2003 may store keyphrase and rejection models 210 and acoustic model 216. Memory 2003 also may store training data structure data and statistics, audio data, input speech data, voice activity detection parameters or data, coefficient data, feature vectors, scores, output scores, keyphrase scores, log likelihood scores, thresholds, or any other data or data structures as discussed herein.

Central processor 2001 and processor(s) 2002 may include any number and type of processing units that may provide the operations as discussed herein. Such operations may be implemented via software or hardware or a combination thereof. For example, processor 2002 may include circuitry dedicated to manipulating data obtained from memory 2003 or dedicated memory. Processor(s) 2002 may be a digital signal processor (DSP), image signal processor (ISP), and/or other fixed function hardware such as fixed function neural network processing hardware. Processor(s) 2002 may be specific purpose hardware for ASR only, or may be shared to perform other non-ASR tasks as well. Furthermore, central processor 2001 may include any number and type of processing units or modules that may provide control and other high level functions for system 2000 as well as the operations as discussed herein. In the illustrated example, system 2000 may be configured to perform keyphrase detection and generate a keyphrase detection model. In an implementation, system 2000 may be considered to include or exclude any one or combination of the modules or units shown here on system 2000. It will be understood that the operation of the units or modules shown here perform tasks similar to those unit or modules with similar labels elsewhere herein.

Memory 2003 may be any type of memory such as volatile memory (e.g., Static Random Access Memory (SRAM), Dynamic Random Access Memory (DRAM), etc.) or non-volatile memory (e.g., flash memory, etc.), and so forth. In anon-limiting example, system memory 2003 may be implemented by cache memory. As shown, in an implementation, feature extraction module 204, acoustic scoring module 206, log likelihood ratio decoder 208, and controller 212 may be implemented via processor(s) 2002. In another implementation, feature extraction module 204, acoustic scoring module 206, log likelihood ratio decoder 208, and controller 212 may be implemented via central processor 2001. In other implementations, all or some or portions of feature extraction module 204, acoustic scoring module 206, log likelihood ratio decoder 208, and controller 212 may be implemented via an execution unit (EU). The EU may include, for example, programmable logic or circuitry such as a logic core or cores that may provide a wide array of programmable logic functions.

While implementation of the example processes 600, 900, and 1300, discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" and "unit" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 21:
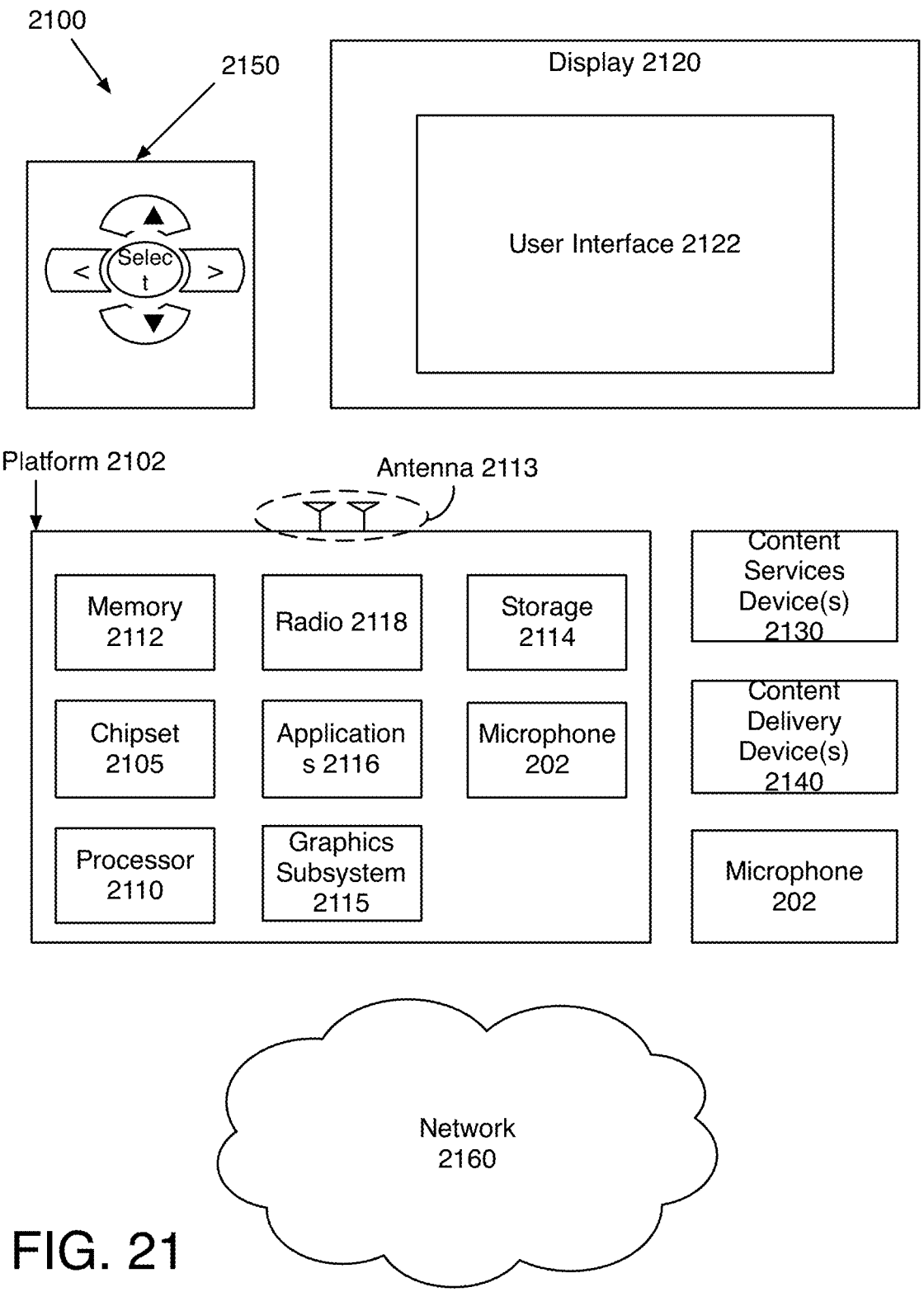
FIG. 21 is an illustrative diagram of an example system.

FIG. 21 is an illustrative diagram of an example system 2100, arranged in accordance with at least some implementations of the present disclosure. In various implementations, system 2100 may be a media system although system 2100 is not limited to this context. For example, system 2100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2100 includes a platform 2102 coupled to a display 2120. Platform 2102 may receive content from a content device such as content services device(s) 2130 or content delivery device(s) 2140 or other similar content sources. As shown, in some examples, system 2100 may include microphone 202 implemented via platform 2102. Platform 2102 may receive input speech via microphone 202 as discussed herein. A navigation controller 2150 including one or more navigation features may be used to interact with, for example, platform 2102 and/or display 2120. Each of these components is described in greater detail below.

In various implementations, system 2100 may provide keyphrase detection as described. For example, keyphrase detection may provide wake on voice capability for a device or environment as described. In other implementations, system 2100 may provide for generating a keyphrase detection model (e.g., including an acoustic model, a rejection model, and a keyphrase model). Such training may be performed offline prior to keyphrase detection for example.

In various implementations, platform 2102 may include any combination of a chipset 2105, processor 2110, memory 2112, antenna 2113, storage 2114, graphics subsystem 2115, applications 2116 and/or radio 2118. Chipset 2105 may provide intercommunication among processor 2110, memory 2112, storage 2114, graphics subsystem 2115, applications 2116 and/or radio 2118. For example, chipset 2105 may include a storage adapter (not depicted) capable of providing intercommunication with storage 2114.

Processor 2110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2110 may be dual-core processor(s), dual-core mobile processor(s), and so forth.

Memory 2112 may be implemented as a volatile memory device such as, but not limited to, a Random Access Memory (RAM), Dynamic Random Access Memory (DRAM), or Static RAM (SRAM).

Storage 2114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2114 may include technology to increase the storage performance enhanced protection for valuable digital media when multiple hard drives are included, for example.

Graphics subsystem 2115 may perform processing of images such as still or video for display. Graphics subsystem 2115 may be a graphics processing unit (GPU) or a visual processing unit (VPU), for example. An analog or digital interface may be used to communicatively couple graphics subsystem 2115 and display 2120. For example, the interface may be any of a High-Definition Multimedia Interface, DisplayPort, wireless HDMI, and/or wireless HD compliant techniques. Graphics subsystem 2115 may be integrated into processor 2110 or chipset 2115. In some implementations, graphics subsystem 2115 may be a stand-alone device communicatively coupled to chipset 2105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 2118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2118 may operate in accordance with one or more applicable standards in any version.

In various implementations, display 2120 may include any television type monitor or display. Display 2120 may include, for example, a computer display screen, touch screen display, video monitor, television-like device, and/or a television. Display 2120 may be digital and/or analog. In various implementations, display 2120 may be a holographic display. Also, display 2120 may be a transparent surface that may receive a visual projection. Such projections may convey various forms of information, images, and/or objects. For example, such projections may be a visual overlay for a mobile augmented reality (MAR) application. Under the control of one or more software applications 2116, platform 2102 may display user interface 2122 on display 2120.

In various implementations, content services device(s) 2130 may be hosted by any national, international and/or independent service and thus accessible to platform 2102 via the Internet, for example. Content services device(s) 2130 may be coupled to platform 2102 and/or to display 2120. Platform 2102 and/or content services device(s) 2130 may be coupled to a network 2160 to communicate (e.g., send and/or receive) media information to and from network 2160. Content delivery device(s) 2140 also may be coupled to platform 2102 and/or to display 2120.

In various implementations, content services device(s) 2130 may include a cable television box, personal computer, network, telephone, Internet enabled devices or appliance capable of delivering digital information and/or content, and any other similar device capable of uni-directionally or bi-directionally communicating content between content providers and platform 2102 and/display 2120, via network 2160 or directly. It will be appreciated that the content may be communicated uni-directionally and/or bi-directionally to and from any one of the components in system 2100 and a content provider via network 2160. Examples of content may include any media information including, for example, video, music, medical and gaming information, and so forth.

Content services device(s) 2130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2102 may receive control signals from navigation controller 2150 having one or more navigation features. The navigation features of controller 2150 may be used to interact with user interface 2122, for example. In various implementations, navigation controller 2150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2150 may be replicated on a display (e.g., display 2120) by movements of a pointer, cursor, focus ring, or other visual indicators displayed on the display. For example, under the control of software applications 2116, the navigation features located on navigation controller 2150 may be mapped to virtual navigation features displayed on user interface 2122, for example. In various implementations, controller 2150 may not be a separate component but may be integrated into platform 2102 and/or display 2120. The present disclosure, however, is not limited to the elements or in the context shown or described herein.

In various implementations, drivers (not shown) may include technology to enable users to instantly turn on and off platform 2102 like a television with the touch of a button after initial boot-up, when enabled, for example. Program logic may allow platform 2102 to stream content to media adaptors or other content services device(s) 2130 or content delivery device(s) 2140 even when the platform is turned "off" In addition, chipset 2105 may include hardware and/or software support for 5.1 surround sound audio and/or high definition 7.1 surround sound audio, for example. Drivers may include a graphics driver for integrated graphics platforms. In various implementations, the graphics driver may comprise a peripheral component interconnect (PCI) Express graphics card.

In various implementations, any one or more of the components shown in system 2100 may be integrated. For example, platform 2102 and content services device(s) 2130 may be integrated, or platform 2102 and content delivery device(s) 2140 may be integrated, or platform 2102, content services device(s) 2130, and content delivery device(s) 2140 may be integrated, for example. In various implementations, platform 2102 and display 2120 may be an integrated unit. Display 2120 and content service device(s) 2130 may be integrated, or display 2120 and content delivery device(s) 2140 may be integrated, for example. These examples are not meant to limit the present disclosure.

In various implementations, system 2100 may be implemented as a wireless system, a wired system, or a combination of both. When implemented as a wireless system, system 2100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 21.

Figure 22:
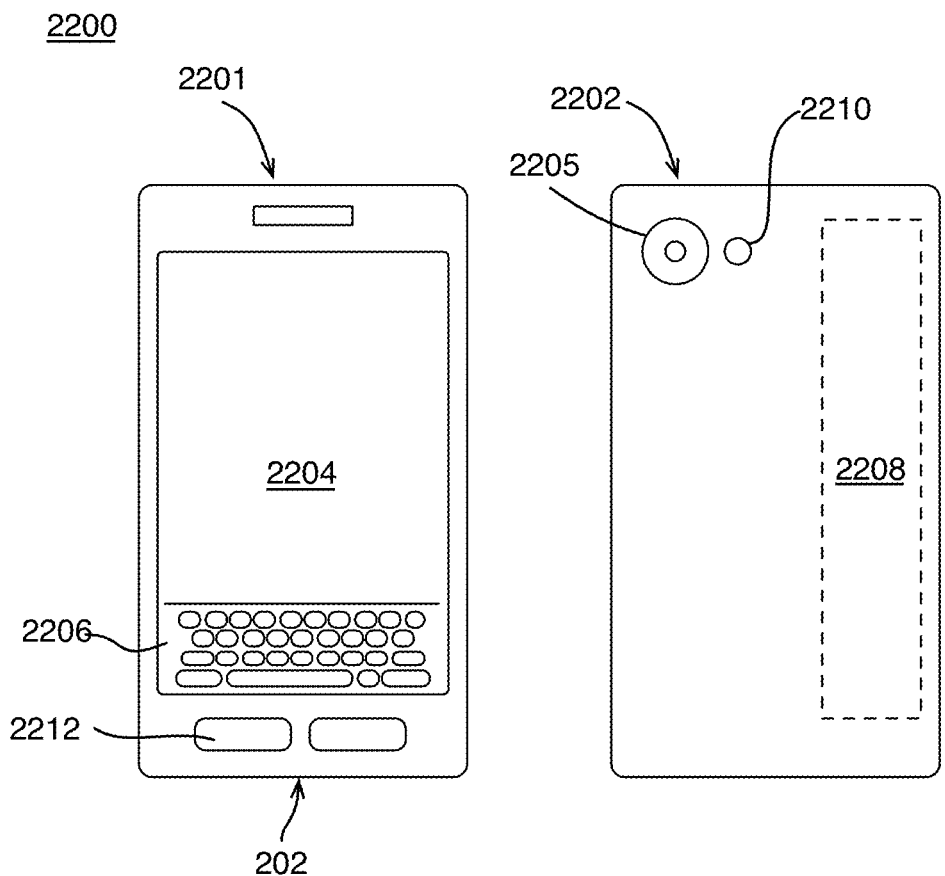
FIG. 22 illustrates an example device, all arranged in accordance with at least some implementations of the present disclosure.

As described above, system 2000 or 2100 may be embodied in varying physical styles or form factors. Referring to FIG. 22, a small form factor device may be arranged in accordance with at least some implementations of the present disclosure. In some examples, system 2000 or 2100 may be implemented via device 2200. In other examples, other devices or systems, or portions thereof may be implemented via device 2200. In various implementations, for example, device 2200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 22, device 2200 may include a housing with a front 2201 and a back 2202. Device 2200 includes a display 2204, an input/output (I/O) device 2206, and an integrated antenna 2208. Device 2200 also may include navigation features 2212. I/O device 2206 may include any suitable I/O device for entering information into a mobile computing device. Examples for I/O device 2206 may include an alphanumeric keyboard, a numeric keypad, a touch pad, input keys, buttons, switches, microphones, speakers, voice recognition device and software, and so forth. Information also may be entered into device 2200 by way of microphone 202, or may be digitized by a voice recognition device. As shown, device 2200 may include a camera 2205 (e.g., including a lens, an aperture, and an imaging sensor) and a flash 2210 integrated into back 2202 (or elsewhere) of device 2200.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), fixed function hardware, field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first implementations, a computer-implemented method of audio keyphrase detection comprises generating a time series of scores of sub-phonetic units associated with received audio input and added silence scores; updating a start state based rejection model and a keyphrase model associated with a predetermined keyphrase based on at least some of the time series of scores of sub-phonetic units, wherein both the rejection model and keyphrase model have states interconnected by transitions; propagating score-related values from the rejection model and through the keyphrase model via the transitions and comprising propagating the values through a series of consecutive silence states to intentionally add silence before or after or both at least part of a spoken keyphrase; and make a keyphrase detection determination depending on a keyphrase detection likelihood score computed by using the keyphrase model.

Also in the first implementation, the method updates the silence states comprises providing multiple silence states with the same scores from an acoustic model.

Further in the first implementation, the method provides that each silence state has multiple self loops to receive multiple scores that are the same for each silence state.

Further in the first implementation, the method the provides that the number of consecutive silence states being used corresponds to a predetermined duration of silence.

Further in the first implementation, the method provides that the silence states are placed after the rejection model and before keyphrase states of the keyphrase model and along the flow of values via the transitions.

Further in the first implementation, the method provides that transitions to individual silence sates include multiple transitions each single transition being associated with a different audio environment within a group of the transitions.

Further in the first implementation, the method provides that transitions to individual silence sates include multiple transitions each single transition being associated with a different audio environment within a group of the transitions, and the method comprises forming a single representative score of the multiple transitions between the same two states, and to update one of the states with the representative score.

Further in the first implementation, the method provides that transitions to individual silence sates include multiple transitions each single transition being associated with a different audio environment within a group of the transitions, and the method comprises forming a single representative score of the multiple transitions between the same two states, and to update one of the states with the representative score, and the provides that a last silence state generates a single transition value by using the representative score input to the last silence state and to provide to keyphrase states of the keyphrase model.

Further in the first implementation, the method provides that the rejection model is arranged to receive rejection scores of one or more context-related rejection speech triphones wherein a context-related triphone has one or two phones changed from phones forming one or more accepted keyphrase speech triphones.

Further in the first implementation, the method provides that the rejection model is arranged to receive scores of triphones each having a centerphone having one or more most occurring centerphone scores in a lexicon classification data structure that receives monophones forming a lexicon as the input to the structure.

In one or more second implementations, a system for performing keyphrase detection comprises: a memory configured to store an acoustic model, a start state based rejection model, and at least one keyphrase model associated with a predetermined keyphrase; and at least one processor coupled to the memory and to operate by: generating the acoustic model to generate a time series of scores of sub-phonetic units in order to update the rejection model and the keyphrase model based on at least some of the time series of scores of sub-phonetic units to generate a keyphrase likelihood score; generating the rejection model to receive rejection scores of triphones forming the sub-phonetic units of the acoustic model, wherein the rejection scores are of rejection speech non-keyphrase triphones having one or two of the phones changed from phones forming at least one accepted keyphrase triphone output of the acoustic model that forms part of a keyphrase to be detected; and generating the keyphrase model to receive values from the rejection model to generate the keyphrase likelihood score to make a keyphrase detection determination.

Further in the second implementation, the system provides that only centerphones of the keyphrase triphones are changed, only a left or right phone or both of the keyphrase triphones are changed, only consonants of the keyphrase triphones are changed, or only vowels of the keyphrase triphones are changed.

Further in the second implementation, the system provides that generating the rejection model comprises obtaining the accepted keyphrase triphones; changing one or two of the phones of the accepted keyphrase triphones to form the non-keyphrase triphones; modeling the non-key-phrase triphones; and arranging the rejection model to receive scores of the non-keyphrase triphones at self loops on the rejection model.

Further in the second implementation, the system provides that only the N-most frequently occurring non-keyphrase triphones in a training set used to form the acoustic model have scores added to the rejection model.

Further in the second implementation, the system provides that the rejection model is arranged to receive scores of triphones or centerphones each associated with or being a centerphone having one or more most occurring centerphone scores in a lexicon classification data structure that receives monophones forming a lexicon as the input to the structure.

Further in the second implementation, the system provides that the keyphrase model comprises states linearly connected by transitions from one state to a next state, and wherein at least two or more consecutive silence states are placed before or after, or both, consecutive keyphrase states to insert silence before or after the keyphrase states.

In one or more third implementations, at least one non-transitory machine readable medium comprising a plurality of instructions that, in response to being executed on a device, cause the device to operate by: generating an audio keyphrase detection model comprising: training an acoustic model having a plurality of rejection output nodes, the rejection output nodes each comprising a sub-phonetic unit some at least in the form of tied context-dependent triphone HMM-states; determining one or more most occurring centerphone scores of triphones and selected in a lexicon classification data structure that receives monophones forming a lexicon as the input to the structure, and determined for each centerphone associated with a different one of the monophones; generating a rejection model comprising arranging the rejection model to receive a rejection score of individual ones of the sub-phonetic units on the acoustic model and that each represent one of the centerphones or one of the triphones; and generating at least one keyphrase model that receives values from the rejection model to make a detection determination.

Further in the third implementation, the device provides that the arranging comprises having the rejection model receive each rejection score at a different self-loop of a single state rejection model.

Further in the third implementation, the device provides that the determining comprises obtaining statistics of the number of occurrences of a centerphone with a same centerphone score, and selecting only the triphones with a centerphone that has the most or N-most occurrences of the centerphone score among the outputs of the lexicon classification data structure.

Further in the third implementation, the device provides that the centerphone score is a probability density function (PDF) score.

Further in the third implementation, the device provides that the acoustic model is pruned so that only the determined triphones form non-keyphrase speech rejection output nodes of the acoustic model.

Further in the third implementation, the device provides that the rejection model is arranged to receive the rejection scores of the triphones each being associated with a different one of the monophones.

Further in the third implementation, the device provides that the rejection model is arranged to receive the one or more most occurring centerphone scores as rejection scores, and wherein each of the monophones has a different one of the centerphone scores.

Further in the third implementation, the device provides that the rejection model is arranged to receive rejection scores of one or more context-related rejection speech triphones wherein a context-related triphone has one or two phones changed from phones forming one or more accepted keyphrase speech triphones.

Further in the third implementation, the device provides that the keyphrase model comprises states linearly connected by transitions from one state to a next state, and wherein at least some consecutive silence states are placed before or after, or both, consecutive keyphrase states to insert silence before or after the keyphrase or both, wherein the number of silence states corresponds to a duration of silence.

In one or more fourth implementations, at least one machine readable medium may include a plurality of instructions that, in response to being executed on a computing device, cause the computing device to perform a method or any functions according to any one of the above implementations.

In one or more fifth implementations, an apparatus or a system may include means for performing a method or any functions according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. A computer-implemented method of audio keyphrase detection comprising:
   generating a time series of scores of sub-phonetic units associated with received audio input and added silence scores;
   updating a start state based rejection model and a keyphrase model associated with a predetermined keyphrase based on at least some of the time series of scores of sub-phonetic units, wherein both the rejection model and keyphrase model have states interconnected by transitions;
   propagating score-related values from the rejection model and through the keyphrase model via the transitions and comprising propagating the score-related values through a series of consecutive silence states to intentionally add silence before or after, or both, the keyphrase model of at least part of a spoken keyphrase, wherein individual silence states each have multiple transitions between a same two consecutive states, each transition being of a different audio environment; and
   make a keyphrase detection determination depending on a keyphrase detection likelihood score computed by using the keyphrase model.

2. The method of claim 1, wherein updating the silence states comprises providing multiple silence states with the same scores from an acoustic model.

3. The method of claim 1, wherein each silence state has multiple self loops to receive multiple scores that are the same for each silence state.

4. The method of claim 1, wherein the number of consecutive silence states being used corresponds to a predetermined duration of silence.

5. The method of claim 1, wherein the silence states are placed after the rejection model and before keyphrase states of the keyphrase model and along a flow of values via the transitions.

6. The method of claim 1 comprising forming a single representative score of the multiple transitions between the same two silence states, and to update one of the silence states with the single representative score.

7. The method of claim 6, wherein a last silence state generates a single transition value by using the representative score input to the last silence state and to provide the single transition value to keyphrase states of the keyphrase model.

8. The method of claim 1, wherein the rejection model is arranged to receive rejection scores of one or more context-related rejection speech triphones wherein a context-related triphone has one or two phones changed from phones forming one or more accepted keyphrase speech triphones.

9. The method of claim 1, wherein the rejection model is arranged to receive scores of triphones each having a centerphone having one or more most occurring centerphone scores in a lexicon classification data structure that receives monophones forming a lexicon as the input to the lexicon classification data structure.

10. A system for performing keyphrase detection comprising:
memory configured to store an acoustic model, a start state based rejection model, and at least one keyphrase model associated with a predetermined keyphrase; and
at least one processor coupled to the memory and to operate by:
generating the acoustic model to generate a time series of scores of sub-phonetic units in order to update the rejection model and the keyphrase model based on at least some of the time series of scores of sub-phonetic units to generate a keyphrase likelihood score;
generating the rejection model to receive rejection scores of triphones forming the sub-phonetic units of the acoustic model, wherein the rejection scores are of rejection speech non-keyphrase triphones having one or two of the changed phones changed from phones forming at least one accepted keyphrase triphone output of the acoustic model that forms part of a keyphrase to be detected,
receiving, at the rejection model, both scores of the changed phones and scores of triphones or centerphones each associated with or being a centerphone having one or more most occurring centerphone scores in a lexicon classification data structure that receives monophones forming a lexicon as the input to the lexicon classification data structure; and
generating the keyphrase model to receive values from the rejection model to generate the keyphrase likelihood score to make a keyphrase detection determination.

11. The system of claim 10, wherein multiple keyphrase triphones are formed, and wherein:
only centerphones of the keyphrase triphones are changed, only a left or right phone or both of the keyphrase triphones are changed, only consonants of the keyphrase triphones are changed, or only vowels of the keyphrase triphones are changed.

12. The system of claim 10 wherein generating the rejection model comprising:
obtaining the at least one accepted keyphrase triphones;
changing one or two of the phones of the at least one accepted keyphrase triphones to form the non-key-phrase triphones;
modeling the non-key-phrase triphones; and
arranging the rejection model to receive scores of the non-keyphrase triphones at self loops on the rejection model.

13. The system of claim 10, wherein only the N-most frequently occurring non-keyphrase triphones in a training set used to form the acoustic model have scores added to the rejection model.

14. The system of claim 10, wherein the keyphrase model comprises states linearly connected by transitions from one state to a next state, and wherein at least two or more consecutive silence states are placed before or after, or both, consecutive keyphrase states to insert silence before or after the keyphrase states.

15. At least one non-transitory machine readable medium comprising a plurality of instructions that, in response to being executed on a device, cause the device to operate by:

generating an audio keyphrase detection model comprising:
training an acoustic model having a plurality of rejection output nodes, the rejection output nodes each comprising a sub-phonetic unit some at least in the form of tied context-dependent triphone HMM-states;
determining one or more most occurring centerphone scores of triphones and selected in a lexicon classification data structure that receives monophones forming a lexicon as the input to the lexicon classification data structure, and determined for each centerphone associated with a different one of the monophones, wherein the determining comprises obtaining statistics of the number of occurrences of a centerphone with a same centerphone score, and selecting only the triphones with a centerphone that has the most or N-most occurrences of the centerphone score among the outputs of the lexicon classification data structure;
generating a rejection model comprising arranging the rejection model to receive a rejection score of individual ones of the sub-phonetic units on the acoustic model and that each represent one of the centerphones or one of the triphones; and
generating at least one keyphrase model that receives values from the rejection model to make a detection determination.

16. The medium of claim 15 wherein the arranging comprises having the rejection model receive each rejection score at a different self-loop of a single state rejection model.

17. The medium of claim 15 wherein the centerphone score is a probability density function (PDF) score.

18. The medium of claim 15 wherein the acoustic model is pruned so that only the determined triphones form non-keyphrase speech rejection output nodes of the acoustic model.

19. The medium of claim 15 wherein the rejection model is arranged to receive the rejection scores of the triphones each being associated with a different one of the monophones.

20. The medium of claim 15 wherein the rejection model is arranged to receive the one or more most occurring centerphone scores as rejection scores, and wherein each of the monophones has a different one of the centerphone scores.

21. The medium of claim 15, wherein the rejection model is arranged to receive rejection scores of one or more context-related rejection speech triphones wherein a context-related triphone has one or two phones changed from phones forming one or more accepted keyphrase speech triphones.

22. The medium of claim 15 wherein the keyphrase model comprises states linearly connected by transitions from one state to a next state, and wherein at least some consecutive silence states are placed before or after, or both, consecutive keyphrase states to insert silence before or after the keyphrase or both, wherein the number of silence states corresponds to a duration of silence.

23. The method of claim 1 wherein each output of the individual silence states is arranged to remove noise from a different audio environment.

* * * * *